(12) United States Patent
Daniell et al.

(10) Patent No.: US 7,689,657 B2
(45) Date of Patent: Mar. 30, 2010

(54) FORWARDING IM MESSAGES TO E-MAIL

(75) Inventors: W. Todd Daniell, Marietta, GA (US); Larry G. Kent, Jr., Loganville, GA (US); Joel A. Davis, Marietta, GA (US); Brian K. Daigle, Marietta, GA (US); Lee G. Friedman, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 11/476,260

(22) Filed: Jun. 28, 2006

(65) Prior Publication Data
US 2006/0248157 A1 Nov. 2, 2006

Related U.S. Application Data

(62) Division of application No. 10/364,693, filed on Feb. 10, 2003.

(51) Int. Cl.
*G06F 15/16* (2006.01)
(52) U.S. Cl. .................. 709/206; 709/207; 455/466
(58) Field of Classification Search ......... 709/203–207; 455/466
See application file for complete search history.

(56) References Cited

U.S. PATENT DOCUMENTS

| | | | |
|---|---|---|---|
| 5,949,866 A | 9/1999 | Coiera et al. | |
| 5,987,508 A | 11/1999 | Agraharam et al. | |
| 6,430,604 B1* | 8/2002 | Ogle et al. | 709/207 |
| 6,654,790 B2* | 11/2003 | Ogle et al. | 709/206 |
| 6,714,793 B1* | 3/2004 | Carey et al. | 455/412.1 |
| 6,745,230 B1 | 6/2004 | Cao et al. | |
| 6,912,564 B1 | 6/2005 | Appelman et al. | |
| 6,941,345 B1 | 9/2005 | Kapil et al. | |
| 6,957,077 B2 | 10/2005 | Dehlin | |
| 7,272,634 B2* | 9/2007 | Clement et al. | 709/206 |
| 7,428,580 B2 | 9/2008 | Hullfish et al. | |
| 2002/0023134 A1* | 2/2002 | Roskowski et al. | 709/206 |
| 2002/0065887 A1 | 5/2002 | Paik et al. | |
| 2004/0064514 A1 | 4/2004 | Daniell et al. | |
| 2004/0078445 A1 | 4/2004 | Malik | |

(Continued)

OTHER PUBLICATIONS

W3C; Title: Extensible Markup Language (XML( 1.0 (Second Edition), W3C Recommendation; Oct. 6, 2000; pp. 1-59.

(Continued)

*Primary Examiner*—Ramy M Osman
(74) *Attorney, Agent, or Firm*—Thomas, Kayden, Horstemeyer & Risley, LLP

(57) ABSTRACT

Systems for forwarding an E-mail message to a user when instant messages from a sender cannot be forwarded to a secondary IM processing device comprise a primary IM processing device configured to send and receive E-mail messages and a router configured to route E-mail messages between the primary IM processing device and a sender's processing device. An E-mail user agent is coupled to the router and configured to provide access to E-mail information including an address of the sender such that an E-mail message can be sent to the sender's processing device. The router is further configured to receive notification at the primary IM processing device of a reply from the sender's processing device. Other systems and methods are also provided.

16 Claims, 16 Drawing Sheets

U.S. PATENT DOCUMENTS

| | | | |
|---|---|---|---|
| 2004/0078448 | A1 | 4/2004 | Malik |
| 2004/0128356 | A1* | 7/2004 | Bernstein et al. ............ 709/206 |
| 2004/0143633 | A1* | 7/2004 | McCarty .................... 709/206 |
| 2004/0193722 | A1 | 9/2004 | Donovan |
| 2004/0203947 | A1 | 10/2004 | Moles |
| 2005/0004992 | A1 | 1/2005 | Horstmann et al. |
| 2005/0030937 | A1 | 2/2005 | Wick et al. |
| 2006/0116139 | A1 | 6/2006 | Appelman |
| 2006/0248157 | A1* | 11/2006 | Daniell et al. ............... 709/207 |

OTHER PUBLICATIONS

Website: http://www.ceruleanstudios.com/trillian/features-1.html; Cerulean Studios Trillian; printed Apr. 23, 2003; pps. include: Features Tour, Messaging Enhancements, Interface Overview, Connect to 5 Mediums, and 3 individual Feature tours.

XMPP Instant Messaging, draft-miller-xmpp-im-00, Jun. 21, 2002, pp. -32.

Day; "A Model for Presence and Instant Messaging", Feb. 2000, pp. 1-17.

Day; "Instant Messaging/ Presence Protocol Requirements", Feb. 2000, pp. 1-26.

W3C; "Extensible Markup Language", W3C Recommendation, XML 1.0, Second Edition, Oct. 6, 2000, pp. 1-59.

WWW.CERULEANSTUDIOS.COM; Trillian> Features Tour (Including Interface Overview, Messaging, Enhancements, Connect to 5 mediums), Apr. 23, 2003, 9 pages.

Miller; XMPP Instant Messaging, draft-miller-smpp-im-00, Network Working Group, Jun. 21, 2002, pp. 1-32.

Daniell; U.S. Appl. No. 10/364,693, filed Feb. 10, 2003.

Daniell; U.S. Appl. No. 10/364,274, filed Feb. 10, 2003.

Daniell; Non- Final Rejection mailed Aug. 10, 2006; U.S. Appl. No. 10/364,693, filed Feb. 10, 2003.

Daniell; Examiner Interview Summary Record mailed Jan. 24, 2007; U.S. Appl. No. 10/364,693, filed Feb. 10, 2003.

Daniell; Final Rejection mailed Jan. 24, 2007; U.S. Appl. No. 10/364,693, filed Feb. 10, 2003.

Daniell; Non- Final Rejection mailed Jul. 13, 2007; U.S. Appl. No. 10/364,693, filed Feb. 10, 2003.

Daniell; Non- Final Rejection mailed Jun. 6, 2007; U.S. Appl. No. 10/364,274, filed Feb. 10, 2003.

Daniell; Final Rejection mailed Nov. 27, 2007; U.S. Appl. No. 10/364,274, filed Feb. 10, 2003.

Daniell; Non-Final Rejection mailed Apr. 4, 2008 for U.S Appl. No. 10/364,274, filed Feb. 10, 2003.

Daniell; Final Rejection mailed Dec. 28, 2007 for U.S. Appl. No. 10/364,693, filed Feb. 10, 2003.

Daniell, Final Rejection mailed Feb. 3, 2009 for U.S. Appl. No. 10/364,693, filed Feb. 10, 2003.

Daniell; Final Rejection mailed May 8, 2009 for U.S. Appl. No. 10/364,274, filed Feb. 10, 2003.

Daniell; Advisory Action mailed Apr. 30, 2009 for U.S. Appl No. 10/364,693, filed Feb. 10, 2003.

Daniell; Interview Summary mailed Aug. 11, 2009 for U.S. Appl. No. 10/364,274, filed Feb. 10, 2003.

Daniell; Non-Final Rejection mailed Sep. 21, 2009 for U.S. Appl. No. 10/364,274, filed Feb. 10, 2003.

Daniell; Non-Final Rejection mailed Aug. 18, 2009 for U.S. Appl. No. 10/364,693, filed Feb. 10, 2003.

Daniell; Notice of Allowance mailed Dec. 14, 2009 for U.S. Appl. No. 10/364,693, filed Feb. 10, 2003.

* cited by examiner

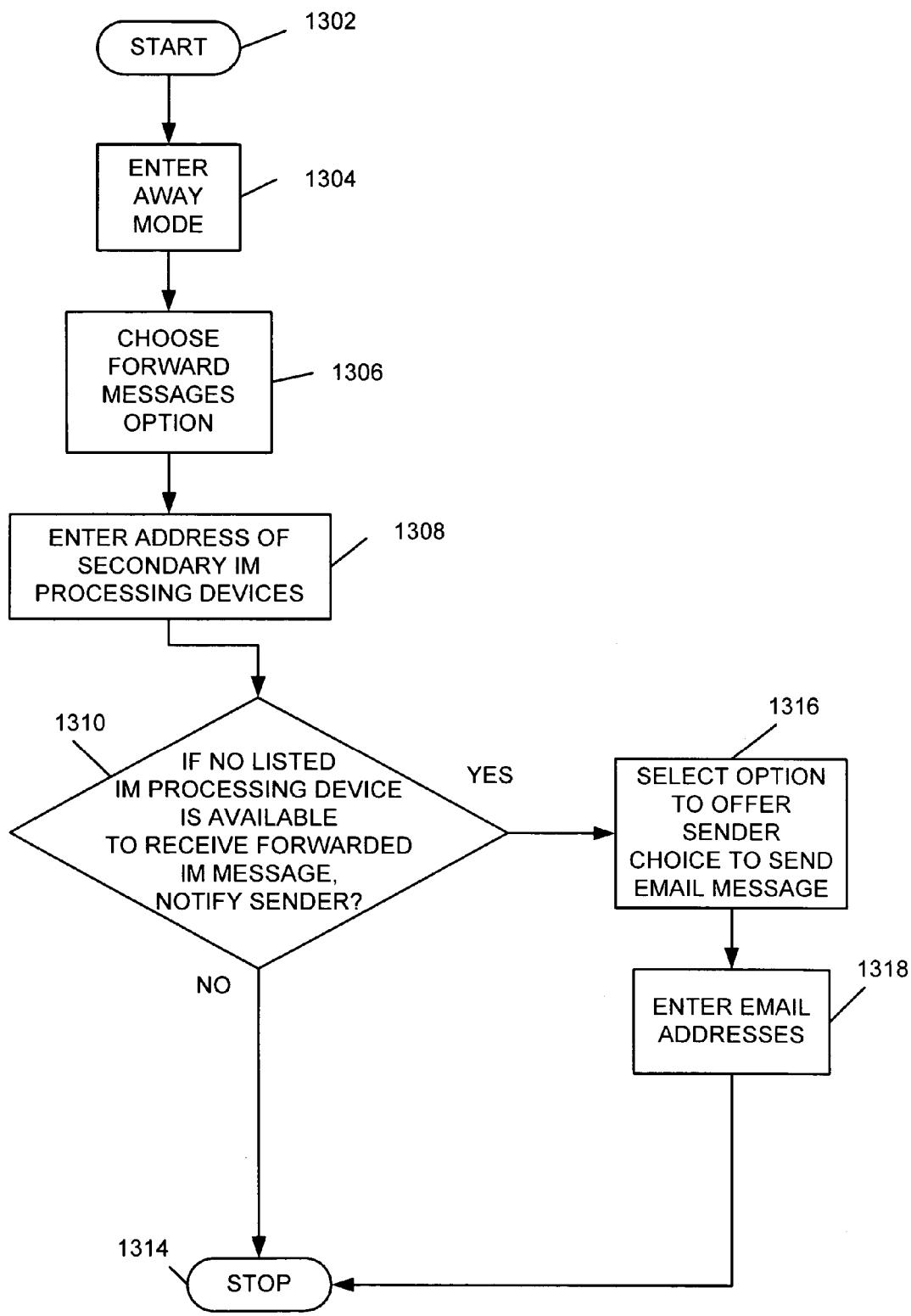

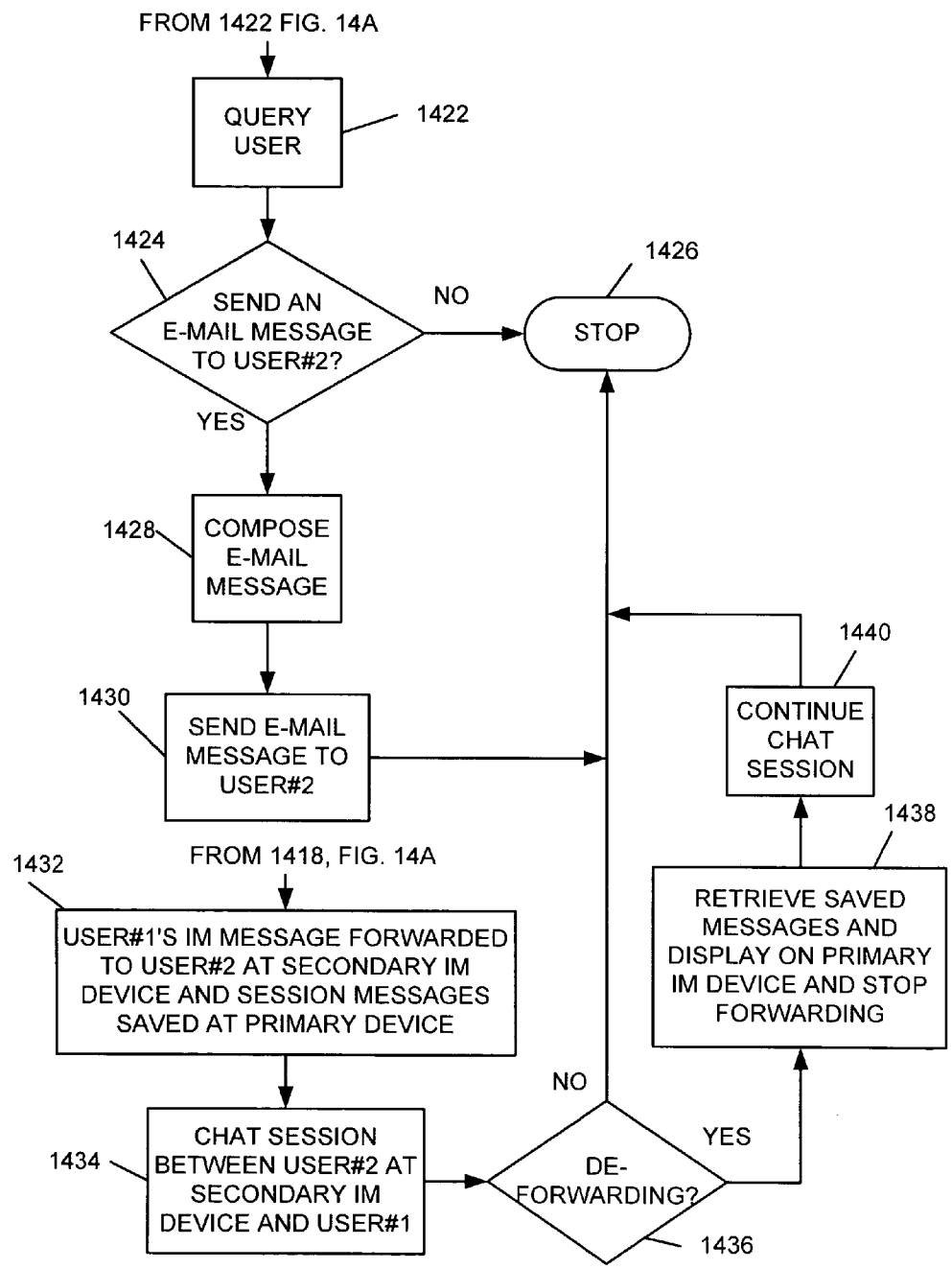

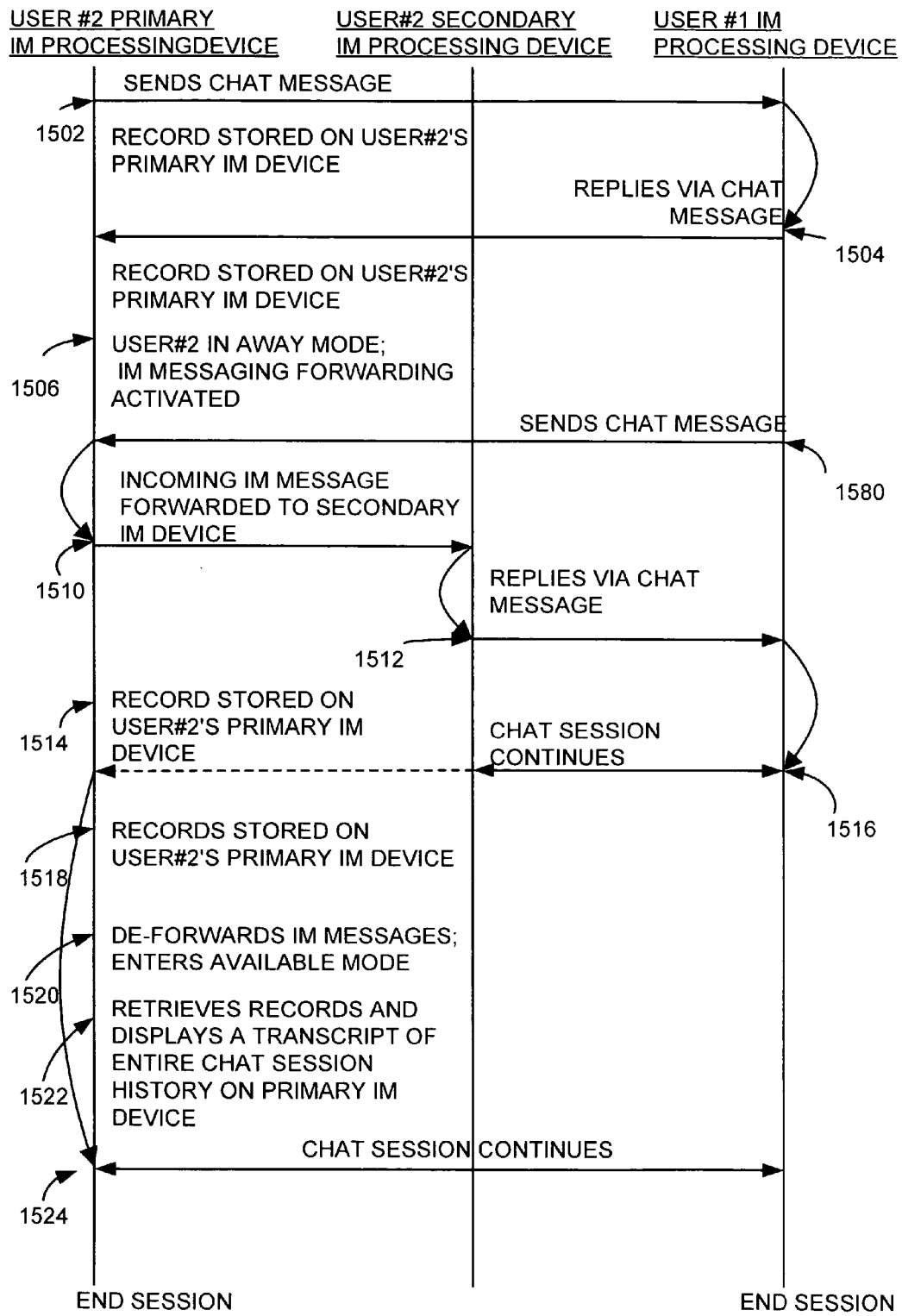

FORWARDING IM MESSAGES TO E-MAIL

CROSS-REFERENCE TO RELATED APPLICATION

This application is a divisional of U.S. utility application entitled, "Forwarding IM Messages to Email," having Ser. No. 10/364,693, filed Feb. 10, 2003, which is entirely incorporated herein by reference.

TECHNICAL FIELD

The present invention is generally related to communications and, more particularly, is related to real-time and near real-time communications.

BACKGROUND OF THE INVENTION

There exists a growing popularity in instant messaging services. Instant messaging is a real-time based communication using the World Wide Web and/or the Internet to create a group to which members of the group utilize a computing device to communicate with each other via chat sessions. Currently, to utilize instant messaging, a user must be present at the computing device. When the user is not at his or her computing device, instant messages are missed and an interactive chat session is not possible.

Thus, a heretofore-unaddressed need exists for a solution that addresses the aforementioned deficiencies and inadequacies.

SUMMARY OF THE INVENTION

The preferred embodiments of the present invention provide systems and methods for client proxy-ing instant messaging system.

Briefly described, in architecture, one preferred embodiment of the system, among others, can be implemented as follows. Systems for forwarding an E-mail message to a user when instant messages from a sender cannot be forwarded to a secondary IM processing device comprise a primary IM processing device configured to send and receive E-mail messages and a router configured to route E-mail messages between the primary IM processing device and a sender's processing device. An E-mail user agent is coupled to the router and configured to provide access to E-mail information including an address of the sender such that an E-mail message can be sent to the sender's processing device. The router is further configured to receive notification at the primary IM processing device of a reply from the sender's processing device.

The preferred embodiment of the present invention can also be viewed as providing methods for deploying a system for handling E-mail messages. In this regard, one embodiment of such a method, among others, can be broadly summarized by the following steps: generating an E-mail message from a primary IM processing device configured to process E-mail and IM messages; sending the E-mail message to a recipient's processing device; and awaiting a response to the E-mail message from the recipient's processing device.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 13 is a flow chart depicting general functionality of a preferred embodiment for implementing a forwarding setup process.

FIGS. 14A and 14B are flow charts depicting more specific functionality of a preferred embodiment for implementing a client proxying system for instant messaging.

FIG. 15 is a data-flow diagram of one embodiment of how forwarded messages are saved before and during forwarding and retrieval after forwarding by primary IM processing device.

DETAILED DESCRIPTION OF THE PREFERRED EMBODIMENTS

Disclosed herein are systems and methods for deploying client proxying for instant messaging. To facilitate description of the inventive system, an example system that can be used to implement the systems and methods for deploying client proxying for instant messaging is discussed with reference to the figures. Although this system is described in detail, it will be appreciated that this system is provided for purposes of illustration only and that various modifications are feasible without departing from the inventive concept.

For example, while several embodiments are described in connection with these drawings, there is no intent to limit the invention to the embodiment or embodiments disclosed herein. On the contrary, the intent is to cover all alternatives, modifications, and equivalents. Additionally, while the following description and accompanying drawing specifically describe forwarding of instant messaging text, it will be clear to one of ordinary skill in the art that the systems and methods presented herein may be extended to other messaging protocols such as voice-over Internet protocol (VoIP), video conferences, electronic mail (E-mail), etc. After the example system has been described, an example of the operation of the system will be provided to explain one manner in which the system can be used to provide for the deployment of client proxying for instant messaging.

Figure 1:
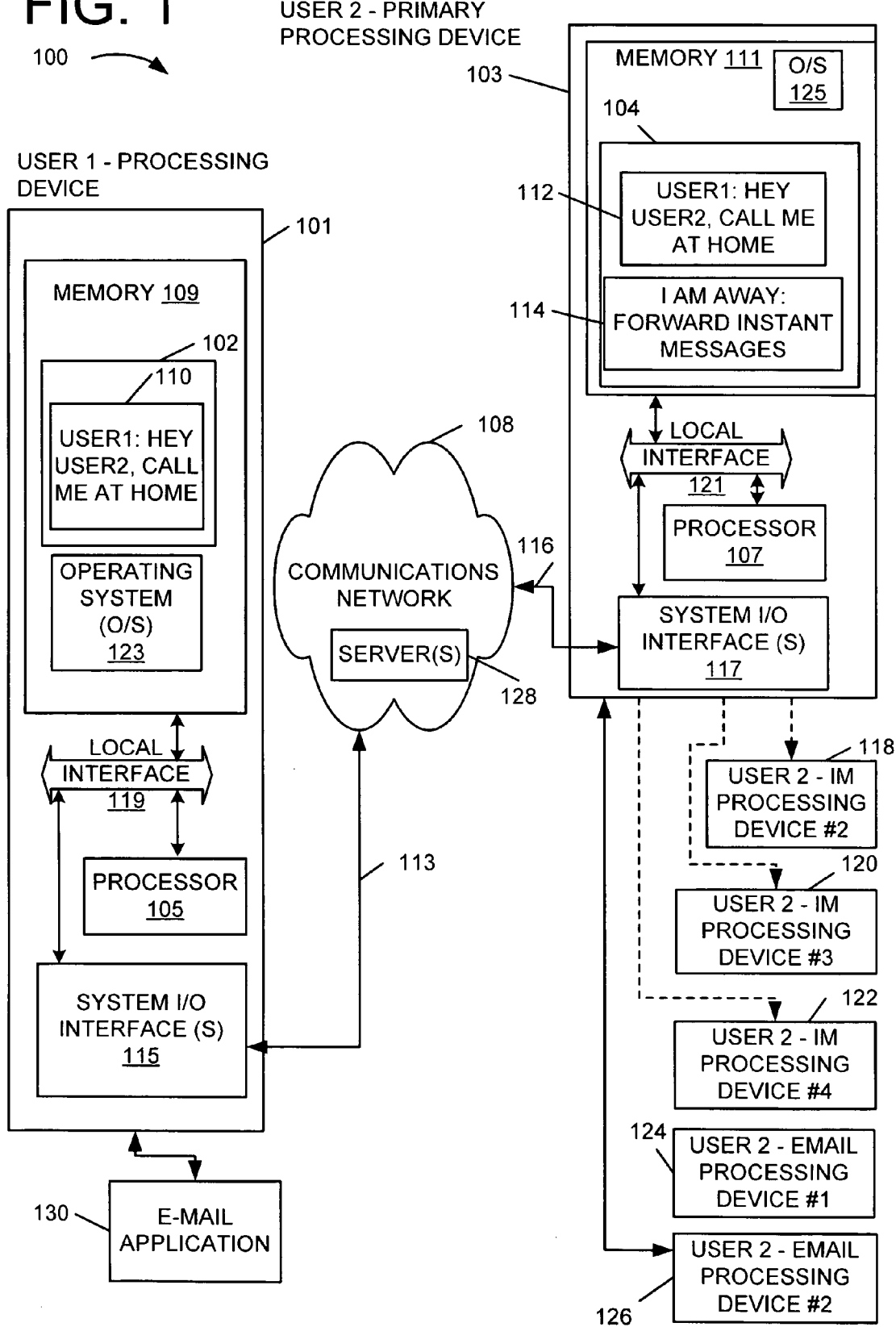
FIG. 1 is a block diagram depicting a preferred embodiment of a system in which a client proxying system for instant messaging may be implemented.

FIG. 1 is a block diagram depicting a preferred embodiment of a system 100 in which client proxying for instant messaging may be implemented. As shown in the nonlimiting example, a user having an IM configured processing device 101 wishes to have a chat session with another user having an IM configured processing device 103 utilizing a communications network 108. The communications network 108 may be any type of network employing any network topology, transmission medium, or network protocol. For example, such a network may be any public or private packet-switched or other data network, including the Internet, circuit-switched network, such as a public switch telecommunications network (PSTN), wireless network, or any other desired communications infrastructure and/or combination of infrastructure. In a preferred embodiment, the communications network 108 is configured as the Internet and includes servers 128 (only one shown for simplicity) for processing services such as Instant Messaging and E-mail, among others.

The processing devices 101, 103 includes client applications 102, 104 (hereinafter referred to as client or clients) that can be implemented in software (e.g., programming stored on a medium, firmware, etc.), hardware, or a combination thereof. In the preferred embodiments, the clients 102, 104 are implemented in software as an executable program, and executed by a special or general purpose digital computer, such as a personal computer (PC; IBM-compatible, Apple-compatible, or otherwise), workstation, minicomputer, or mainframe computer.

Generally, in terms of hardware architecture, each processing device 101, 103 includes, inter alia, a processor 105, 107 and memory 109, 111. Input and/or output (I/O) devices 115, 117 (or peripherals) can be communicatively coupled to a local interface 119, 121. The local interface 119, 121 can be, for example but not limited to, one or more buses or other wired or wireless connections, as is known in the art. The local interface 119, 121 may have additional elements, which are omitted for simplicity, such as controllers, buffers (caches), drivers, repeaters, and receivers, to enable communications. Further, the local interface 119, 121 may include address, control, and/or data connections to enable appropriate communications among the aforementioned components.

The I/O devices 115, 117 may preferably include input devices, for example but not limited to, a keyboard, mouse, scanner, microphone, etc. Furthermore, the I/O devices 115, 117 may also include output devices, for example but not limited to, a printer, display, etc. Finally, the I/O devices 115, 117 may further include devices that communicate both inputs and outputs to the network 108, for instance but not limited to, a modulator/demodulator (modem; for accessing another device, system, or network), a radio frequency (RF) or other transceiver, a telephonic interface, a bridge, a router, etc.

The processor 105, 107 is preferably a hardware device for executing software, particularly that stored in memory 110, 111. The processor 105, 107 can preferably be any custom made or commercially available processor, a central processing unit (CPU), an auxiliary processor among several processors, a semiconductor based microprocessor (in the form of a microchip or chip set), a macroprocessor, or generally any device for executing software instructions.

The memory 109, 111 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 109, 111 may incorporate electronic, magnetic, optical, and/or other types of storage media. Note that the memory 109, 111 can have a distributed architecture, where various components are situated remote from one another, but can be accessed by the processor 109, 111.

The software and/or firmware in memory 109, 111 may include one or more separate programs, each of which comprises an ordered listing of executable instructions for implementing logical functions. In the example of FIG. 1, the software in the memory 109, 111 includes programming for displaying a chat window 110, 112, roster window 114, and a suitable operating system (O/S) 123, 125. The operating system 123, 125 essentially controls the execution of other computer programs, and provides scheduling, input-output control, file and data management, memory management, and communication control and related services.

The clients 102, 104 are preferably adapted to handle normal IM functions that may include handling translations of IM functions from various protocols into XML-structured information. The clients 102, 104 include software applications that assists a user in communicating with contacts via an IM session. In this regard, the clients 102, 104 may be stored in a personal computer, a handheld computer, a cellular telephone having IM capabilities, an i-pager, or any network-compatible device.

The clients 102, 104 include programming for displaying a chat window 110, 112 in which a message can be displayed. In an example, User 1 wishes to have a chat session with User2. Responsive to input from User1, a message is displayed in User1's chat window 110, for example, "hey user2, call me at home." The message is sent via a path 113 over the communications network 108. Servers 128, such as IM servers process the chat message and the message is sent via path 116 to User2's primary IM processing device 103.

User2's primary IM processing device 103 includes the chat window 112 and a roster window 114. In an example, the roster window 114 displays the availability of User2. In an example, User2's roster window 114 may display that User2 is unavailable, e.g., in an away mode, and has requested that IM messages be forwarded. In some embodiments, user availability is displayed in other areas of a display device such as in an options window of a display device. In other embodiments, the availability of User2 is not displayed.

User2's availability can also be determined through presence information. Generally, in an IM system, each time a user logs onto the system, a server, such as an IM server receives an initial set of presence indicators from a client processing device, such as online-available. Presence can change by user input or lack of activity at a client processing device. For example, a user may change presence from online-available to online-away, online-extended away, online-do not disturb or the user may logoff, among other presence types. The IM server periodically queries the client processing device for presence information. The IM server notes the change in presence and an event change indication will be sent from the IM server to any associated client processing devices. Other client processing devices connected to the system may also receive the event change notification. Presence can also change when no activity such as keystroke or mouse movement from the client processing device occurs over a designated time period. For example, if a user does not utilize the keyboard for 30 minute duration, the status of the client processing device may change from online-present to online-extended away state. When a user's presence is online-away, on-line-extended away, online-do not disturb or offline, in a typical setting, the IM server considers that user unavailable for a chat session at that processing device. However, with the forwarding aspect of this invention, a user who is unavailable at a primary IM processing device can elect to have IM messages forwarded to a secondary IM processing device.

Generally, the primary IM processing device 103 queries secondary IM processing devices 118, 120, 122 for presence information. The client 104 of User2's primary IM processing device 103 receives a response back from the devices 118, 120, 122 reporting availability status. If the client 104 does not receive a response back from a device 118, 120, 122, in a preferred embodiment, that device 118, 120, 122 is considered offline. In addition, the server 128, such as an IM server, preferably queries the client 104 for its presence information. The IM server can drop the client 104 from the system when a response is not received from the client 104. In a preferred embodiment, in a forwarded state, an IM server can report presence information on behalf of the client 104.

In an example, a chat message from User1's IM processing device 101 is sent through the network 108 to User2's primary IM processing device 103. User2's primary IM processing device 103 is considered online (after login) until a chat session is established. When the chat message from processing device 101 is sent to processing device 103, if User2's primary IM processing device 103 is offline or does not report presence information to User 1's processing device 101, User2's presence will be switched to offline and a chat session cannot take place. If the presence of User2's primary IM processing device 103 presence is reported as available, (i.e., online) a first chat session is established.

Responsive to User2 providing input to 103, to cause the client in 104 to enter a forwarding mode, User2's primary IM processing device 103 will attempt to forward the IM message from User1 to any other available secondary IM processing devices that User2 has established to receive messages when processing device #1 103 is in the forwarding mode. In an alternative preferred embodiment, User2's primary IM processing device 103 enters the forwarding mode when an on-line away presence indication is recognized by an IM server coupled to the processing device 103 due to factors such as inactivity at a keyboard associated with User2's primary IM processing device 103.

Primary IM processing device 103 will try to forward the IM message to User2's secondary IM processing device 118. The IM message is sent through 116 to the communications network and respective IM server to determine if processing device 118 is available. Availability is based upon the IM server having presence information for the processing device that the device is online-present. If processing device #2 118 is unavailable, an attempt is made to send the message from the primary IM processing device 103 to User2's IM processing device #3 120. If processing device #3 120 is similarly unavailable, processing device 103 attempts to send the message to User2's IM processing device #4 122. Processing device #4 122 is available and the IM message is forwarded to processing device #4 122. A second chat session is established between the primary IM processing device 103 and processing device #4 122 such that User1's IM processing device 101 can have a chat session with processing device #4 122. Thus, the primary IM processing device 103 serves as a bridge from one chat session (i.e., User1 processing device 101 to User2 primary IM processing device 103) to forwarded chat session (i.e., User2 primary IM processing device 103 to processing device #4 122).

In a preferred embodiment, the primary client processing device 103 replaces or stamps the information identifying the message as being from the primary IM processing device 103 with identifying information from secondary processing device 122. For example, if User2's IM address at the primary IM processing device 103 is tdaniell@im.bellsouth.net, and the User2's IM address at processing device 122 is todd@imcingular.com, when the chat message is returned to User1, the address of the message will be todd@imcingular.com. In one preferred embodiment, the new user address is stamped by a transport object associated with the secondary processing device (i.e., processing device 122) before returning the message to the sender. In an alternative preferred embodiment, the user address of the primary IM processing device 103 is replaced by the client 104 of the forwarding processing device 103 by backspacing over the original user address and inserting the address of the user's secondary processing device.

If the attempt to forward the message to User2's last IM processing device, i.e., User2's IM processing device #4 122 is unsuccessful because the processing device 122 is unavailable, an attempt is made to send User 1's processing device 101 an E-mail message when User2 has established E-mail forwarding as an option. When a user establishes the forward to E-mail option, the user effectively always appears online.

In an example, User2's primary IM processing device 103 sends a request to User1's IM processing device 101 to determine if User1 wishes to send an E-mail message to User 2. In an alternative embodiment, User2's primary IM processing device 103 sends a message to User1 and waits for a response. User2's client 104 checks for E-mail addresses in an address book database (not shown) for an address of User1. If an E-mail address exists, the client 104 selects the first E-mail address for User1 and sends User1 a message. In a preferred embodiment, User2's E-mail processing device 126 automatically creates an email message that is sent from the primary IM processing device 103 to User1's processing device 101. The client 104 of the forwarding processing device 103 will check for E-mail addresses in order to send User1 an E-mail message. In an alternative preferred embodiment, User2's client 104 waits a designated period of time for a responsive E-mail reply message. In a preferred embodiment, User2's client waits two minutes for a reply message. In an embodiment, User1 accesses an E-mail application 130, composes a message and sends the message via the path 113, or other path, over the communications network 113 to User2's primary IM processing device 103. In another preferred embodiment, the E-mail message is automatically sent from User1's E-mail application 130 to User2's primary IM processing device 103. If no reply message is received during the waiting period, the client 104 assumes User1 is unavailable. If the client 104 receives a reply message, User1 is assumed to be available and an E-mail session can occur. For users utilizing an IM and E-mail network provided by the same service provider, for example BellSouth.net, among others, a E-mail message is sent from User2's primary IM processing device 103 to User1's processing device 101 requesting or prompting as to whether the user wishes to send an E-mail message when the an IM message is undeliverable in a forwarded mode. If User1 affirmatively replies, an E-mail message is sent from User1's processing device 101 to User2's primary IM processing device 103. If the user does not wish to receive an E-mail message, the session terminates.

The client 104 saves a history of the ongoing chat sessions and E-mail messages. Upon de-forwarding of the primary IM processing device 103, a record of the chat sessions is preferably displayed in the chat window 112. If preferred, User2 can continue the chat session at the primary IM processing device 103 upon de-forwarding. In another preferred embodiment, de-forwarding automatically occurs upon the primary IM processing device 103 changing to an online-present state.

Figure 2:
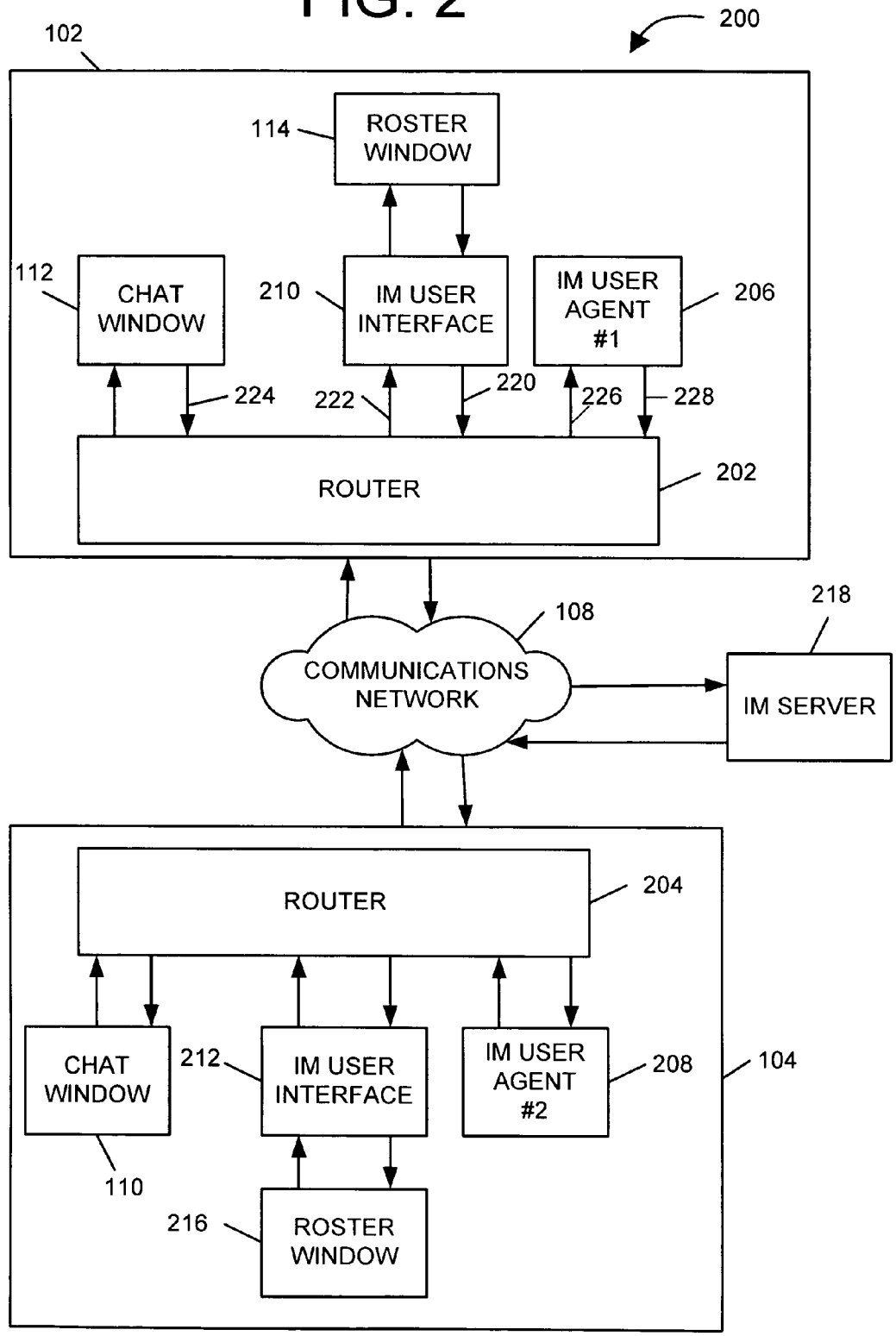
FIG. 2 is a block diagram depicting a preferred embodiment of an illustrative example of a system in which a client proxying system for instant messaging may be implemented.

FIG. 2 is a block diagram depicting a preferred embodiment of an illustrative example of a system 200 in which a client proxying system may be implemented in processing devices 101, 103 (not shown) including clients 102, 104, communications network 108 and an IM server 218. In the example shown in FIG. 2, two users communicate with each other utilizing IM via chat windows 110, 112, however the invention is not limited to only two users. In an example, the system 200 includes chat windows 110, 112, communications network 108, routers 202, 204, IM User Agent #1 206, IM User Agent #2 208, IM user interfaces 210, 212, roster windows 114, 216, and an IM server 218. The IM server 218 may include an abstraction server (shown in FIG. 3). In an example, the IM server 218 is adapted to handle normal IM functions while the abstraction server is adapted to handle translations of IM functions into XML-structured information. In an example embodiment, various components 110, 112, 114, 202, 204, 206, 208, 210, 212, 216, may be seen as software modules, which are launched by users on a personal computer 101, 103 or other programmable device (not shown). In another embodiment, various components 110, 112, 114, 202, 204, 206, 208, 210, 212, 216, 218 may be seen as software objects in a distributed network which are instantiated and destroyed by appropriate software commands. Since instantiation and destruction of objects in distributed networks are well known, further discussion of object instantiation and destruction is omitted.

In one embodiment, the various components 110, 112, 114, 202, 204, 206, 208, 210, 212, 216 of FIG. 2 are software modules on a user's personal computer 101, 103. In this regard, the software modules are installed on a user's personal computer 101, 103 and, thereafter, are launched by users. Preferably, during installation of the software modules, each user is queried for the user's login names and passwords for all of the user's IM accounts, for embodiments providing access to multiple accounts. The login names and passwords for the user's IM accounts are stored in a login database (not shown) for subsequent use by the software modules.

Upon installation of the software modules onto the personal computer 101, 103, a user launches the router 202 (or 204). The router 202, 204 generates commands to launch the IM user agent 206 (or 208). In a preferred embodiment, the IM User agent 206, 208 performs as a background process. In response to generated commands, the various components 110, 112, 114, 202, 210, 212, 216 are launched as background processes.

The router 202, 204 is configured to track communications and route messages between the IM user agent #1 and #2 206, 208, IM user interface 210, 212, chat windows 110, 112, and the IM server 218. In this regard, the router 202, 204 receives commands from the IM user agent # 1, #2 206, 208, chat windows 110, 112 and IM user interface 210, 212. Similarly, the router 202, 204 generates commands and directs the generated (or received) commands to the IM user agent #1, #2 206, 208, chat windows 110, 112, IM user interface 210, 212, and IM server 218. In an example, the router 202, 204 is configured to send and receive queries to the IM server 218 for presence information. Thus, in a general sense, the router 202, 204 receives information (e.g., commands, requests, data, etc.) and directs the received information to the appropriate software module.

In another embodiment, the various components 110, 112, 114, 202, 204, 206, 208, 210, 212, 216 of FIG. 2 are objects in a distributed network (not shown). In this regard, subsequent to installation of the software modules, when a user launches the router 202, 204, the router 202, 204 instantiates the IM user agent # 1 206 (or #2 208), IM user interface 210, 212 and chat window 110, 112, and runs these objects on the client system 101, 103 as background processes.

Regardless of whether the various components 110, 112, 114, 202, 204, 206, 208, 210, 212, 216 are launched as software modules or instantiated as distributed objects, once the various components 110, 112, 114, 202, 204, 206, 208, 210, 212, 216 are running as background processes, the router 202, 204 launches a IM user interface 210, 212, which requests the user to select the IM user interface 210, 212. Upon selection of the IM user interface 210, 212, the router 202, 204 instantiates the IM user interface 210, 212, which queries the user for the user's IM login name and password.

The IM user agent 206, 208 receives the login name and password and looks in a login database in the IM server 218 to determine whether or not the login name and password are valid (i.e., whether or not the login name and password are located in the login database). If the login name and password are valid, then the IM user agent 206, 208 retrieves login names and passwords for all of the user's IM accounts.

Upon retrieving the login names and passwords of all the user's IM accounts from the login database, the IM user agent 206, 208 logs into each of the user's IM accounts through an IM server 218 using the respective login names and passwords for each of the user's IM accounts. The logging into various IM accounts through the IM server is described in detail in U.S. provisional patent application Ser. No. 60/411,336 and 60/419,613, and U.S. patent application Ser. Nos. 10/274,408, 10/274,478 and 10/274,405, which are incorporated herein by reference as if set forth in their entireties. Thus, further discussion of logging into various IM accounts is omitted here.

Upon logging into the various IM accounts, the IM user agent 206, 208 obtains Internet presence information for all of the user's IM contacts as described in U.S. provisional patent application Ser. Nos. 60/411,336 and 60/419,613 and U.S. patent application Ser. Nos. 10/274,408, 10/274,478 and 10/274,405, which are incorporated herein by reference as if set forth in their entireties. Thus, further discussion of obtaining presence information for contacts is omitted here.

Upon logging into the user's various IM accounts and retrieving the Internet presence information of the user's contacts, the IM user agent 206, 208 generates a command to the router 202, 204 to display the retrieved IM information. Upon receiving the command to display the retrieved IM information, the router 202, 204 requests the IM user interface 210, 212 to instantiate a roster window 114, 216 for displaying the user's contacts and the contacts' respective IM Internet presence information. The IM user agent 206, 208 conveys the IM information having the contacts' names and contacts' IM Internet presence information to the router 202, 204. The router 202, 204 further conveys the IM information to the IM user interface 210, 212, which displays the IM contact names and their respective IM Internet presence information to the user at the roster window 114, 216. Thus, at this point, all of the contacts and their respective IM Internet presence information are available to the user at the roster window 114, 216.

An option that is provided to the user at the roster window 114, 216 is the option to chat with a contact. In operation, the user's IM contacts and their respective IM Internet presence information are displayed to the user at the roster window 114, 216. Upon receiving a selection of one of the IM contacts by the user, the roster window 114, 216 generates a request, for example request 218, to the IM user interface 210 to generate a chat window 110, 112. The request 218 includes information related to the selected contact. The IM user interface 210 conveys the request 220 to the router 202, which receives the request 220 and generates a command 222 to the IM user interface 210 to instantiate the chat window 112. The command 222 includes a pointer to the IM user agent 206. The IM user interface 210, in response to the command 222 from the router 202, instantiates the chat window 102. Upon being instantiated, the chat window 102 issues a request 224 to the IM user agent 206 to request 226 the establishment a chat session with the selected contact, for example a user logged into IM accounts at IM user agent #2 208. For example, a request 228 from the IM User Agent #1 206 to the router 202 can initiate a chat session. Since the initiation of chat sessions at chat windows is well known in the art, further discussion of initiating chat sessions at chat windows is omitted. In an embodiment, the chat window 110 can be initiated utilizing the same process as described for chat window 112.

In one embodiment, the system shown in FIG. 2 permits a user to initiate a chat session and engage in a chat session with any of the contacts regardless of the contacts' IM account (e.g., BellSouth™ IM account, AOL™ IM account, Yahoo™ IM account, MSN™ IM account, among others) as is addressed in greater details in U.S. provisional patent application Ser. Nos. 60/411,336 and 60/419,613, and U.S. patent application Ser. Nos. 10/274,408, 10/274,478 and 10/274,405, which are incorporated herein by reference in their entireties. Of course, other embodiments are also included that function with only one IM system or other subsets.

Figure 3:
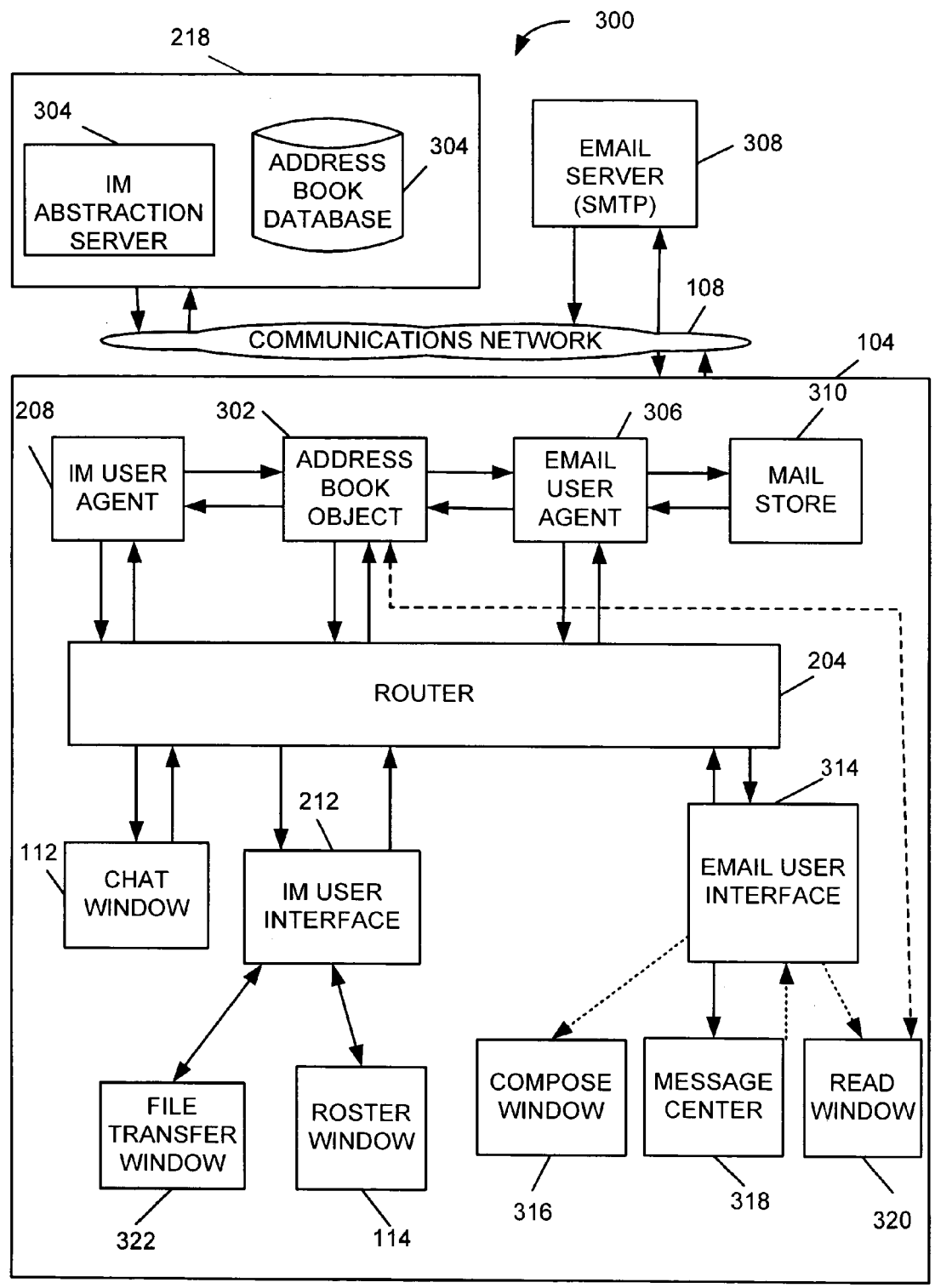
FIG. 3 is a block diagram depicting an overview of a component architecture related to an integration of Instant Messaging and E-Mail messaging in which a client proxying system may be implemented.

FIG. 3 is a block diagram depicting an overview of component architecture 300 related to an integration of Instant Messaging and E-Mail messaging in which a client proxying system may be implemented. Other embodiments include client 104 with no E-mail capability. The component architecture of FIG. 3 is discussed in relationship to one user, however, the component architecture can be configured from a plurality of users. The IM related components described with reference to FIG. 2 that are depicted on FIG. 3 will presented here with a truncated explanation.

E-mail related components in FIG. 3 include an address book object 302, an address book database 305, an E-mail user agent 306, E-mail server 308, mail store 310, address book user interface 312, E-mail user interface 314, compose window 316, message center 318, and read window 320. The IM user interface 212 includes access to a file transfer window 322. In an example embodiment, various components of FIG. 3 may be seen as software modules, which are launched by a user on a personal computer 103 or other programmable device (not shown). In another embodiment, the various components may be seen as software objects in a distributed network (not shown), which are instantiated and destroyed by appropriate software commands. Since instantiation and destruction of objects in distributed networks is well known, further discussion of object instantiation and destruction is omitted.

When the components are software modules, upon installation of the software modules onto the personal computer 101, 103, a user launches the router 204. The router 202 generates and launches commands to the IM user agent 208, the address book object 302, the E-mail user agent 306, and the address book database 305 as background processes. In response to the generated commands, the various components, 208, 302, 305, 306, are launched as background processes. The address book object 302 is coupled to the address book database 305 so that information may be stored to the address book database 305 by the address book object 302 or retrieved from the address book database 305 by the address book object 302. Information stored in the address book database 305 may include, for example, names and E-mail addresses of the user's E-mail contacts, names and IM addresses of the user's IM contacts, phone numbers for the various E-mail and IM contacts, mailing addresses for the various E-mail and IM contacts, business addresses for the various E-mail and IM contacts, etc.

The IM user agent 208 and the E-mail user agent 306 are configured to communicate with the address book object 302. In this regard, the address book object 302 functions as an interface between the IM user agent 208 and the E-mail user agent 306. In a broader sense, the address book object 302 interfaces the entire IM system (for example as shown in FIGS. 1 and 2) to the entire E-mail system (not shown in FIG. 3), thereby providing integration between the E-mail system and the IM system.

The router 204 is configured to track communications between the IM user agent 208, the address book object 302, and the E-mail user agent 306. In this regard, the router 204 receives commands from the IM user agent 208, the address book object 302, and the E-mail user agent 306. Similarly, the router 204 generates commands and directs the generated (or received) commands to the IM user agent 208, the address book object 302, and the E-mail user agent 306.

The client 104 is preferably configured to provide presence information to servers and to query servers, such as the IM server 218 for presence information. In some embodiments, the client 104 queries servers of disparate networks, for instance, Yahoo server, AOL servers, etc. for presence information utilizing known standards for providing presence information. In an example, presence information can be represented as states such as: 1=online-present; 2=online-away; 3=online-extended away; 4=online-do not disturb; and 5=offline: where, a present state indicates the user is available for a chat session; an away state indicates the user's client has experience no activity such as keystrokes or mouse movement for a defined period of time; extended away indicates the user's client has had no activity for a period of time greater than the away time frame; do not disturb indicate the user is blocking others; and offline indicates the user has logged off the system. When the client 104, the IM server 218 in one preferred embodiment perform a query, return status via a number from 1-5 that represents the current state of the user's client. When a chat message is attempted to be sent between users where a user's presence is state 4 or 5, i.e., online do not disturb or offline, the chat message will be undeliverable. In the example, as a user's client changes presence, the presence change information will be sent to the IM server 218 and any other clients in the system receive an event notification of a change in presence.

In another embodiment, the various components are objects in a distributed network (not shown). In this regard, subsequent to installation of the software modules, when a user launches the router 204, the router 204 instantiates the IM user agent 208, the address book object 302, the E-mail user agent 306, and the address book database 305 and runs these objects on the client 104 as background processes. The address book object 302 is coupled to the address book database 305 so that information may be stored to the address book database 305 by the address book object 302 or retrieved from the address book database 305 by the address book object 302. The IM user agent 208 and the E-mail user agent 306 communicate with the address book object 302, thereby using the address book object 302 as an interface between the IM user agent 208 and the E-mail user agent 306.

Once the various components are running as background processes, the router 204 launches the IM user interface 212 which requests the user to select an IM interface 212 or an E-mail user interface 314. When the user selects the IM user interface 212, the user can proceed with a chat session as described in the discussion regarding FIG. 2. When the user selects the E-mail user interface 314, the router 204 retrieves the login names and passwords, which were previously stored during installation of the software modules, from a login database in the abstraction server 304. The E-mail login names and passwords are conveyed to the E-mail user agent 306, which receives the login names and passwords.

Upon receiving the login names and passwords of all of the user's E-mail accounts, the E-mail user agent 306 logs into each of the user's E-mail accounts at the various E-mail servers 308 using the respective login names and passwords. Upon logging into each of the user's E-mail accounts, the E-mail user agent 306 retrieves all of the E-mail messages stored on the E-mail accounts and stores them at a local mail store 310. In an example embodiment, the user's E-mail accounts are simple mail transfer protocol (SMTP) E-mail accounts. Additionally, the user's E-mail account may be post office protocol version 3 (POP3) compatible. The E-mail user agent 306 and address book object 302 permit the automatic retrieval of multiple E-mail messages from multiple E-mail accounts, and the storage of the retrieved E-mail messages according to their respective originating E-mail accounts.

Upon retrieving multiple E-mail messages from multiple E-mail accounts and storing them at the mail store 310, the E-mail user agent 306 generates a command to the router 204 to launch or instantiate the E-mail user interface 314 to display the retrieved E-mail messages to the user. Upon receiving the command to launch or instantiate the E-mail user interface 314, the router 204 instantiates the E-mail user interface 314, which, in turn, instantiates a message center 318 for displaying the retrieved E-mail messages. The E-mail user agent 306 retrieves the stored E-mail messages from the mail store 310 and conveys the E-mail messages to the router 204. The router 204 further conveys the E-mail messages to the E-mail user interface 314, which displays the E-mail messages at the message center 318. Thus, at this point, all of the E-mail messages from all of the user's E-mail accounts are available to the user at the message center 318. In another embodiment, the message center 318 may be instantiated with a pointer to the mail store 310, thereby permitting direct retrieval of the E-mail messages from the mail store 310 by the message center 318.

Another option that is provided to the user at the message center 318 is the option to compose a new E-mail message to a contact. If the user selects the option to compose a new E-mail message, then the message center 318 generates a request 324 to the E-mail user interface 314 to generate a compose window 316. The E-mail user interface 314 conveys the request 326 to the router 204, which receives the request and generates a command 328 to the E-mail user interface 314 to instantiate the compose window 316. The command 328 includes a pointer to the address book object 302, which eventually permits the compose window 316 to access the address book database 305 through the address book object 302, thereby permitting retrieval of E-mail addresses of contacts. The E-mail user interface 314, in response to the command 328 from the router 204, instantiates the compose window 316 with direct access to the address book object 302. Since composing new messages is well known in the art, further discussion of composing new messages is omitted here.

Yet another option that is provided to the user at the message center 318 is the option to read an E-mail message from a contact. In operation, all of the user's E-mail messages are displayed to the user at the message center 318. Upon receiving a selection of one of the displayed E-mail messages for reading by the user, the message center 318 generates a request to the E-mail user interface 314 to generate a read window 320. The request includes information related to the selected E-mail message, such as a globally-unique identifier (GUID) associated with the selected E-mail message. The E-mail user interface 314 conveys the request to the router 204, which receives the request and generates a command to the E-mail user interface 314 to instantiate the read window 320. The command includes a pointer to the address book object 302 and a pointer to the E-mail user agent 306. The pointer to the address book object 302 eventually permits the read window 320 to access the address book database 305 through the address book object 302. The E-mail user interface 314, in response to the command from the router 204, instantiates the read window 320. Upon being instantiated, the read window 320 issues a request to the E-mail user agent 306 to retrieve the selected E-mail message. The E-mail user agent 306 receives the request and retrieves the selected E-mail message from the mail store 310. The retrieved E-mail message is conveyed from the E-mail user agent 306 to the read window 320 and displayed to the user at the read window 320. While reading of E-mail messages is well known in the art, it is worthwhile to note that, unlike prior systems, the preferred system of FIG. 3 preferably permits a user to read E-mail messages from any of the user's E-mail accounts (e.g., a BellSouth E-mail account, an AOL E-mail account, a Yahoo E-mail account, an MSN E-mail account, etc.). Of course, other embodiments are also included that function with only one E-mail system or other subsets.

In addition to logging into the various E-mail accounts, the router 204 initiates a login to each of the user's IM accounts. As described above with reference to FIG. 2, the router 204 retrieves the login names and passwords. The router 204 conveys the IM login names and passwords to the IM user agent 208.

Another option provided to the user at the roster window 114 is the option to transfer files to a contact. If the user selects the option to transfer a file, then the roster window 114 generates a request to the E-mail user interface 314 to generate a file transfer window 322. The E-mail user interface 314 conveys the request to the router 204, which receives the request and generates a command to the E-mail user interface 314 to instantiate the file transfer window 322. The command includes a pointer to the address book object 302, which eventually permits the file transfer window 322 to access the address book database 305 through the address book object 302, thereby permitting retrieval of E-mail addresses and IM addresses of the contacts. The E-mail user interface 314, in response to the command from the router 204, instantiates the file transfer window 322 with direct access to the address book object 302. Since transferring files from IM roster windows is well known in the art, further discussion of transferring files from IM roster windows is omitted here. However, it is worthwhile to note that, unlike prior systems, the system of FIG. 3 permits file transfers to contacts at various IM services (e.g., AOL IM, MSN IM, Yahoo IM, BellSouth IM, etc.) and at various E-mail services (e.g., AOL E-mail, MSN E-mail, Yahoo E-mail, BellSouth E-mail, etc.), regardless of the contacts' IM or E-mail service provider. Of course, embodiments are included which provide for no file transfer functionality.

Upon receiving the login names and passwords of all of the user's IM accounts, the IM user agent 208 logs into each of the user's IM accounts through an IM abstraction server 304 using the respective login names and passwords. The logging into various IM accounts through the IM abstraction server 304 is described in detail in U.S. provisional patent application Ser. Nos. 60/411,336 and 60/419,613, and U.S. patent application Ser. Nos. 10/274,408, 10/274,478, and 10/274, 405, which are incorporated herein by reference as if set forth in their entireties. Also, a similar login process is shown with reference to FIG. 6 for E-mail accounts. Thus, further discussion of logging into various IM accounts through the IM abstraction server 304 is omitted here.

Upon logging into the various IM accounts, the IM user agent 206 obtains Internet presence information for all of the user's IM contacts as described in U.S. provisional patent application Ser. Nos. 60/411,336 and 60/419,613, and U.S. patent application Ser. Nos. 10/274,408, 10/274,478, and 10/274,405. In an example, a presence server maintains Internet presence information on client processing devices and sends that presence information either periodically or upon demand to the client processing device.

As seen from the component architecture of FIG. 2 and FIG. 3, the launching of the router 204 results in retrieval of all of the user's E-mail messages and all of the contacts' IM Internet presence information.

Figure 4:
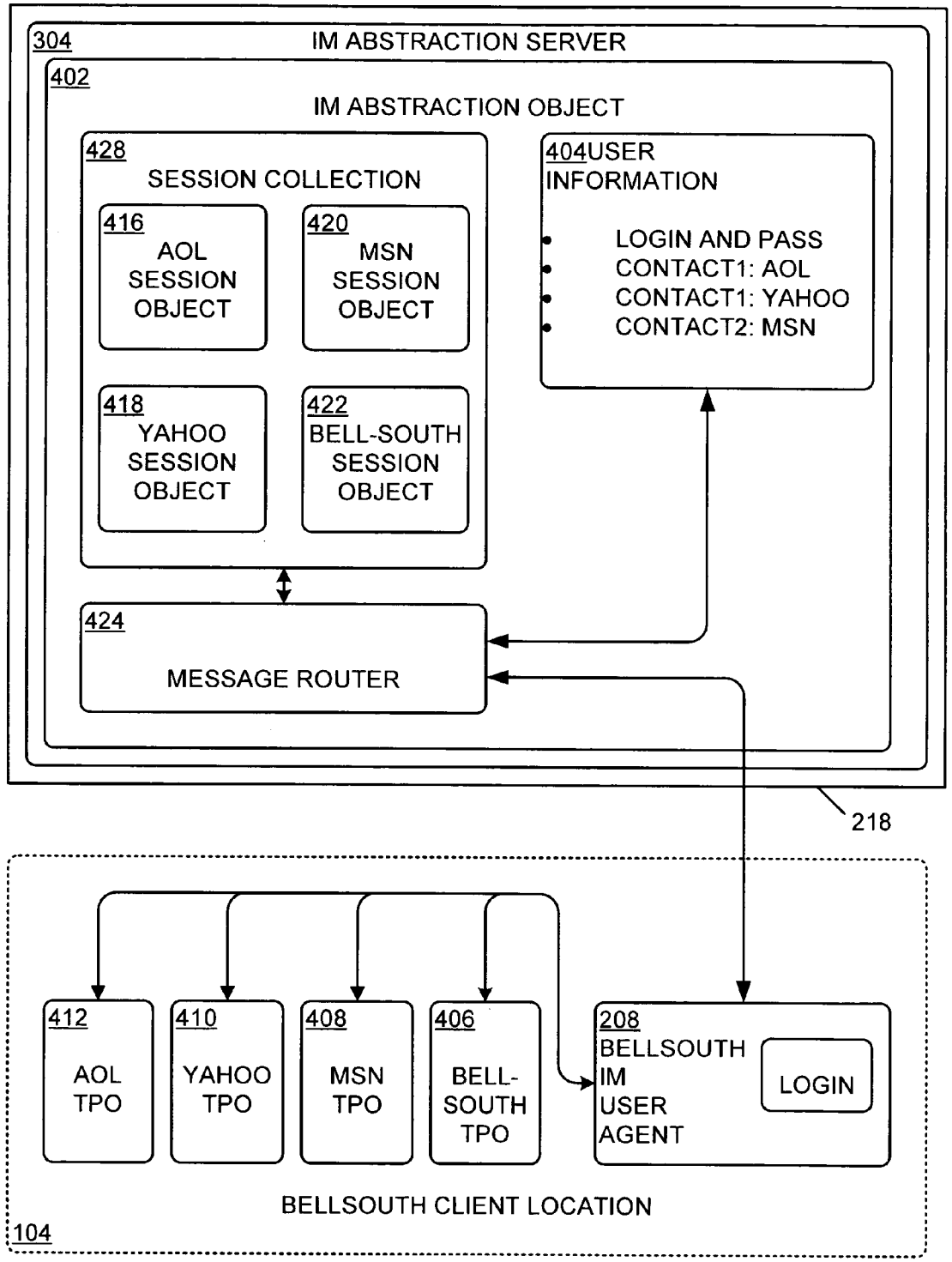
FIG. 4 is a block diagram depicting an illustrative example of a user agent instantiating a plurality of transport protocol objects at a client.

FIG. 4 is a block diagram depicting an illustrative example of a user agent instantiating a plurality of transport protocol objects at a client 104 (or 102). After a setup process, which itself may launch a login process, a user, such as a BellSouth user, inputs a login name and a password at the user interface 212 (not shown FIG. 4). This information is conveyed to an IM abstraction object 402 located at the IM abstraction server 304 in the IM server 218. The IM abstraction object 402 accesses the user information 404 to retrieve login names and passwords for each of the IM accounts for the BellSouth IM user. Upon retrieving this information, the IM abstraction object 402 generates a request to the IM user agent 208. The request includes information for instantiating a variety of transport protocol objects (TPOs). Thus, upon retrieving the request, the IM user agent 208 instantiates a BellSouth TPO 406, a MSN TPO 408, a Yahoo TPO 410 and an AOL TPO 412 at the BellSouth client location 104. Thus, as shown in FIG. 4, by providing a single BellSouth IM user login and password, multiple TPOs are instantiated because the information needed to instantiate the various TPOs is already stored at the IM abstraction object 402.

Since the TPOs 406, 408, 410, 412 are instantiated in the client 104, in accordance with one example embodiment, the translation from XML to the BellSouth protocol, the translation from XML to the AOL protocol, the translation from XML to the Yahoo protocol, and the translation from XML to the MSN protocol each occurs at the client location 104, thereby relinquishing resources at the abstraction server 304 for other functions.

The message router 424 stores the session information as shared session objects 416, 418, 420, 422 in the session collection 428. Thus, the AOL TPO 412 generates an AOL session ID, which is conveyed to a message router 424 for storage in the AOL session object 416. Similarly, the Yahoo TPO 410, the MSN TPO 408, and the BellSouth TPO 406 each generates a Yahoo session ID, a MSN session ID, and a BellSouth session ID, respectively. The session IDs are conveyed to the message router 424, which stores the Yahoo session ID in the Yahoo session object 418, the MSN session ID in the MSN session object 420, and the BellSouth session ID in the BellSouth session object 422.

Figure 5:
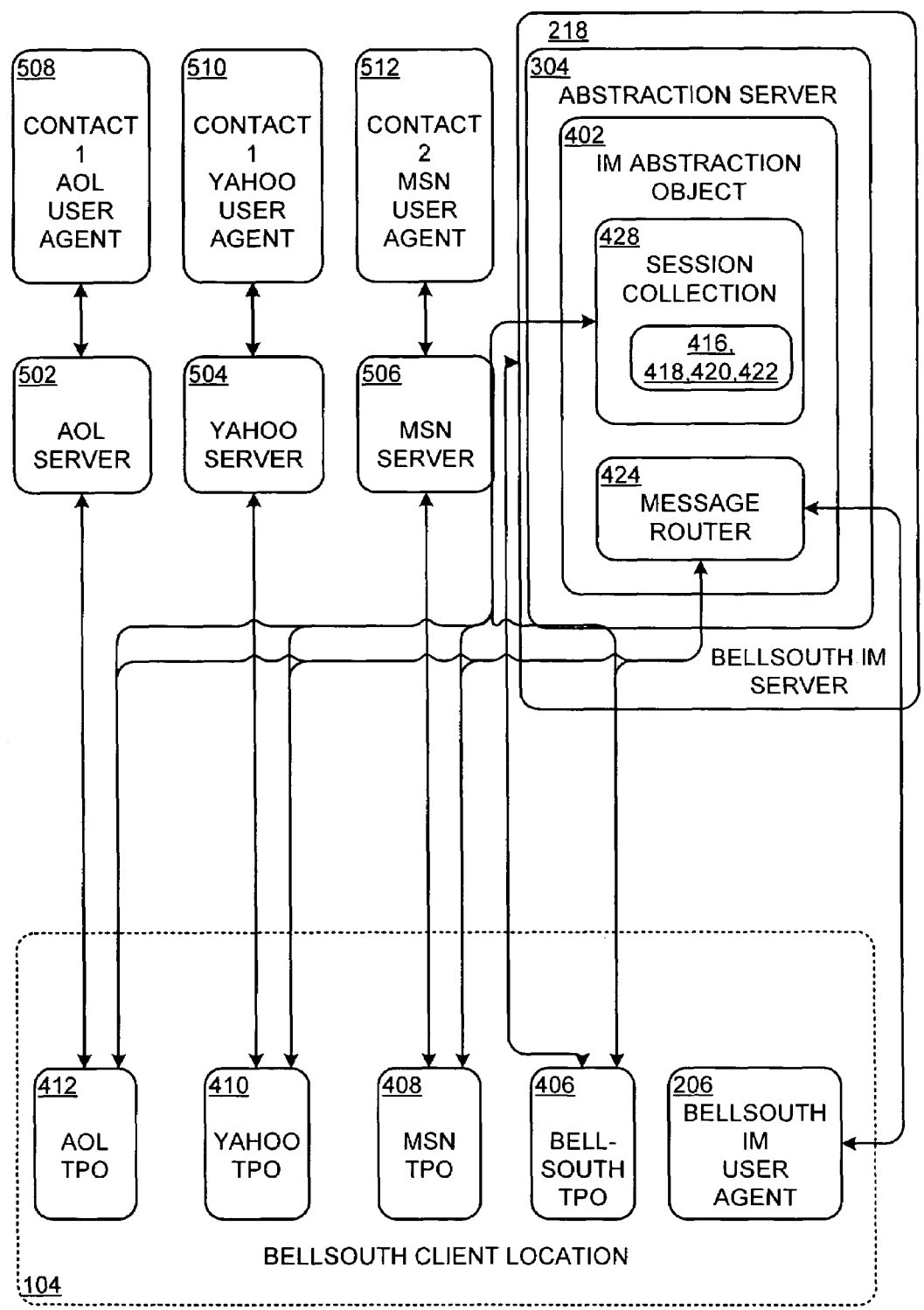
FIG. 5 is a block diagram depicting an illustrative example of a user agent communicating with a plurality of servers through the plurality of TPOs at a client processing device.
Figure 6:
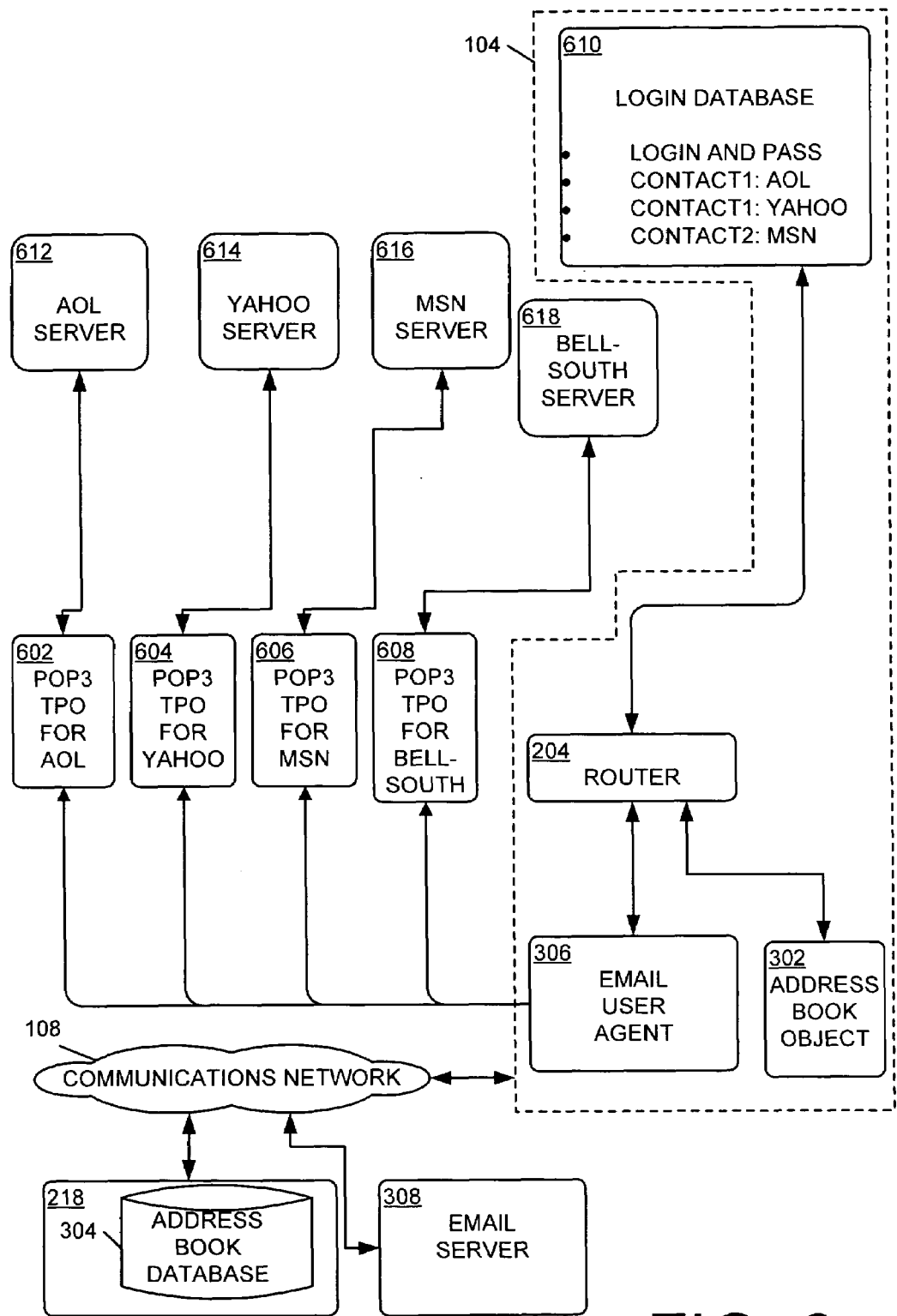
FIG. 6 is a block diagram depicting an illustrative example of an E-mail agent communicating with a plurality of POP3's for a plurality of E-mail TPOs.

In an example, the router 424 includes rules for routing IM messages to the various TPOs 406, 408, 410, 412 and can route to E-mail servers (shown in FIG. 5 and FIG. 6). The router 424 is also configured to echo or mirror presence information to each of the TPOs 406, 408, 410, 412. An incoming chat message from an MSN TPO 408 may arrive at the BellSouth IM user agent 208, for example. The IM user agent 208 preferably determines whether the user has activated message forwarding. As described in more detail below, a forwarding priority list is included with addresses with where to attempt to forward the incoming IM message. For example, if the first address on the forwarding priority list is an MSN address, the router 204 of the client 104 of the primary IM processing device 103 attempts to send the message to the IM processing device associated with the MSN TPO 408. If a IM processing device associated with the MSN TPO 408 is unavailable, the IM user agent 208 gets another address from the message router 424 to send the message to the address of the next IM processing device on the forwarding priority list, for instance an address requiring routing over the Yahoo TPO 410. If the IM processing device associated the Yahoo TPO 410 is unavailable, the IM user agent 208 the IM user agent 208 gets another address from the message router 424 to send the message to the address of the next IM processing device on the forwarding priority list. The process continues attempting to forward the IM message to an address of an available secondary IM processing device.

Once an available IM processing device is found, a chat session occurs between the sender of the IM message and a user associated with the available secondary IM processing device. Effectively, two chat sessions are taking place during a forwarding mode. One is between the sender's IM processing device and the recipient's primary IM processing device and the other is between the recipient's primary IM processing device and the available secondary IM processing device. If a secondary IM processing device is not available, as will be discussed in greater detail below, the client 104 may inquire as to whether the sender wishes to send an E-mail message to the recipient of the undeliverable chat message.

FIG. 5 is a block diagram depicting an illustrative example of a user agent communicating with a plurality of servers through the plurality of TPOs at the client location 104. In an example, instantiated TPOs 406, 408, 410, 412 translate between IM objects 402 and their respective IM servers 502, 504, 506, 218 to provide interoperability between the various protocols. Upon being instantiated, each of the TPOs 406, 408, 410, 412 communicates with its respective server 502, 504, 506, 218 to establish a session, and upon receiving tokens or other session identifiers from its respective server 502, 504, 506, 218 generates a session identifier (ID). The session ID and the session information are conveyed back to the message router 424. It is worthwhile to note that the TPOs 406, 408, 410, 412 communicate with the various servers 502, 504, 506, and 218 in the native protocol of the various servers. Thus, for example, the AOL TPO 412 communicates with the AOL server 502 using an AOL native protocol; the Yahoo TPO 410 communicates with the Yahoo server 504 using a Yahoo native protocol; the MSN TPO 408 communicates with the MSN server 506 using a MSN native protocol, etc. In this regard, each of the TPOs 412, 410, 408, 406 appear as a native client to each of the servers 502, 504, 506, 218.

FIG. 6 is a block diagram depicting an illustrative example of an E-mail agent of a client 104 communicating with a plurality of POP3 E-mail TPOs, and a user may log into several E-mail accounts to retrieve E-mail messages. In this regard, FIG. 6 shows E-mail components similar to the IM components shown in U.S. provisional patent application Ser. Nos. 60/411,336 and 60/419,613, and U.S. patent application Ser. Nos. 10/274,408, 10/274,478, and 10/274,405. While the embodiments of FIG. 6 refers to specific Internet service providers (e.g., Yahoo, Microsoft Network (MSN), America On-Line (AOL), BellSouth, etc.), it should be understood that these specific references are provided for purposes of clarity, and are not intended to limit the invention to the specifically provided examples. Such is similarly true for other specific references herein. Since similar transport mechanisms are described in U.S. provisional patent application Ser. Nos. 60/411,336 and 60/419,613, and U.S. patent application Ser. Nos. 10/274,408, 10/274,478, and 10/274,405, only a truncated discussion of E-mail transport mechanisms is presented with reference to FIG. 6.

As shown in an example embodiment in FIG. 6, after a setup process, the router 204 accesses a login database 610 to retrieve login names and passwords for each E-mail account belonging to a user. The example of FIG. 6 shows the user as having post office protocol version 3 (POP3) E-mail accounts on AOL, Yahoo, MSN, and BellSouth. Since POP3 is known in the art, further discussion of POP3 is omitted here. Upon retrieving the login names and passwords, the router 204 generates a request to the E-mail user agent 306, which includes information for instantiating one or more transport protocol objects (TPOs). Each of the TPOs is configured to provide an interface to each of the user's POP3 E-mail accounts. Thus, in response to the request, the E-mail user agent 306 instantiates POP3 TPOs 602, 604, 606, 608 for the user's AOL E-mail account, Yahoo E-mail account, MSN E-mail account, and BellSouth E-mail account. Other embodiments may include transport mechanisms launched or activated in other manners.

Instantiated POP3 TPOs 602, 604, 606, 608 log into their respective E-mail servers 612, 614, 616, 618 to retrieve E-mail messages from the various E-mail servers 612, 614, 616, 618. Upon being instantiated, each of the POP3 TPOs 602, 604, 606, 608 receives the login names and passwords for their respective E-mail server 612, 614, 616, 618, thereby permitting the POP3 TPOs 602, 604, 606, 608 to log into the user's E-mail accounts at their respective server 612, 614, 616, 618. Upon logging into each of the E-mail accounts at the various E-mail servers 612, 614, 616, 618, each of the POP3 TPOs 602, 604, 606, 608 retrieves E-mail messages from its respective server 612, 614, 616, 618. In this regard, for example, the AOL POP3 TPO 602 retrieves E-mail messages from the AOL server 612; the Yahoo POP3 TPO 604 retrieves E-mail messages from the Yahoo server 614, etc. The retrieved E-mail messages are conveyed to the router 204, which, in turn, conveys the E-mail messages to the E-mail user agent 306. Since the E-mail messages are directed through different POP3 TPOs 602, 604, 606, 608, each E-mail message may be sorted by the E-mail user agent 306 according to its originating E-mail account (e.g., AOL E-mail account, Yahoo E-mail account, MSN E-mail account, BellSouth E-mail account, etc.). Consequently, when the user chooses to reply to a received E-mail message, the E-mail user agent 306, in one embodiment, may direct the reply E-mail message through the same POP3 TPO through which the E-mail message was received. In other words, the reply to an E-mail message uses the same E-mail account from which the E-mail message was received. Thus, for example, if the E-mail user agent 306 receives an E-mail message through the user's AOL E-mail account, then the reply to that E-mail message, in one embodiment, would be directed to the recipient through the user's AOL account. Similarly, if an E-mail message is received through the user's BellSouth E-mail account, then the reply to that E-mail message would be directed to the recipient through the user's BellSouth E-mail account. In addition, messages may also be directed through accounts other than those originating on E-mail messages, such as when IM messages are forwarded to designated forwarding E-mail addresses, among other examples.

The address book object 302, the E-mail user agent 306, the IM user agent 208, the router 204, shown in FIG. 3, and other objects instantiated by these components may be implemented in hardware, software, firmware, or a combination thereof. In the preferred embodiment(s), the address book object 302, the E-mail user agent 306, the IM user agent 208, the router 204, and other objects instantiated by these components implemented in software or firmware that is stored in a memory and that is executed by a suitable instruction execution system. If implemented in hardware, as in an alternative embodiment, the address book object 302, the E-mail user agent 306, the IM user agent 208, the router 204, and other objects instantiated by these components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In an example, when the primary IM processing device 103 is in a forwarding mode and a secondary IM processing device is unavailable, an E-mail option may be one way to communicate with the sender's processing device 101. The E-mail user agent 306 communicates with the address book database 304 through the router 204 to obtain an E-mail address of the sender of the IM message. In a preferred embodiment, a first E-mail address of the priority list is utilized. Once obtained, the E-mail message is composed as described above and sent to the IM processing device 101. In a preferred embodiment, the router 204 waits a designated period of time, such as two minutes, for a response from the E-Mail server 612, 614, 616, 618 for a response. The router 204 is configured with a counter for counting time. In an example, the router 204 receives a response such as an event notification from the E-mail server 612, 614, 616, 618 via the POP3 602, 604, 606 and 608 and E-mail user agent 306. If a response is received at the router 204 within the expected time period, the message is loaded into the client 104 and the router 204 is notified that a message has been received bound for a particular address and including name, subject, and bracket identification of where the message came from utilizing POP3 standards. In addition, the router 204 can associate the E-mail message as part of the same chat session based on thread information from the message and transaction identifying information. The router 204 can verify that the correct message has been received because preferably each E-mail message is stamped at the POP3 602, 604, 606 and 608 with a message identification and transactional identification and includes a subject line using POP3 standards. Thus the router 204 can determine where to send a reply message based on the message identification information, among other information. If a response is not received at the router 204 within the expected time period, the router 204 assumes the sender's IM processing device 101 is unavailable and the transaction ends.

In an alternative preferred embodiment, where User1 and User2 utilize a specified IM service, such as IM service provided by BellSouth.net, the primary IM processing device 103 prompts the sending IM processing device 101 as to whether they wish to send the recipient an E-mail message when an attempt to forward the senders IM message to the recipient's secondary IM processing device is unsuccessful. The request to send an E-mail will preferably appear in the chat window 112 of the User1's client 102. In an example, User1 can respond by affirmative sending a response such as a chat message to User2's primary IM processing device 103 or select an option presented such as yes or no that is returned to User2's primary IM processing device 103, among other options. If User1 does not wish to send User2 an E-mail message, the transaction ends. If User1 wishes to send an email to User2, User1 composes an E-mail message as described above and the message is sent to User2.

A record of E-mail messages is stored in the router 204. Upon de-forwarding, history of the transactions is transferred to the chat window 110 and the conversation can continue as part of the same conversation held prior to entering the forwarding mode.

Figure 7:
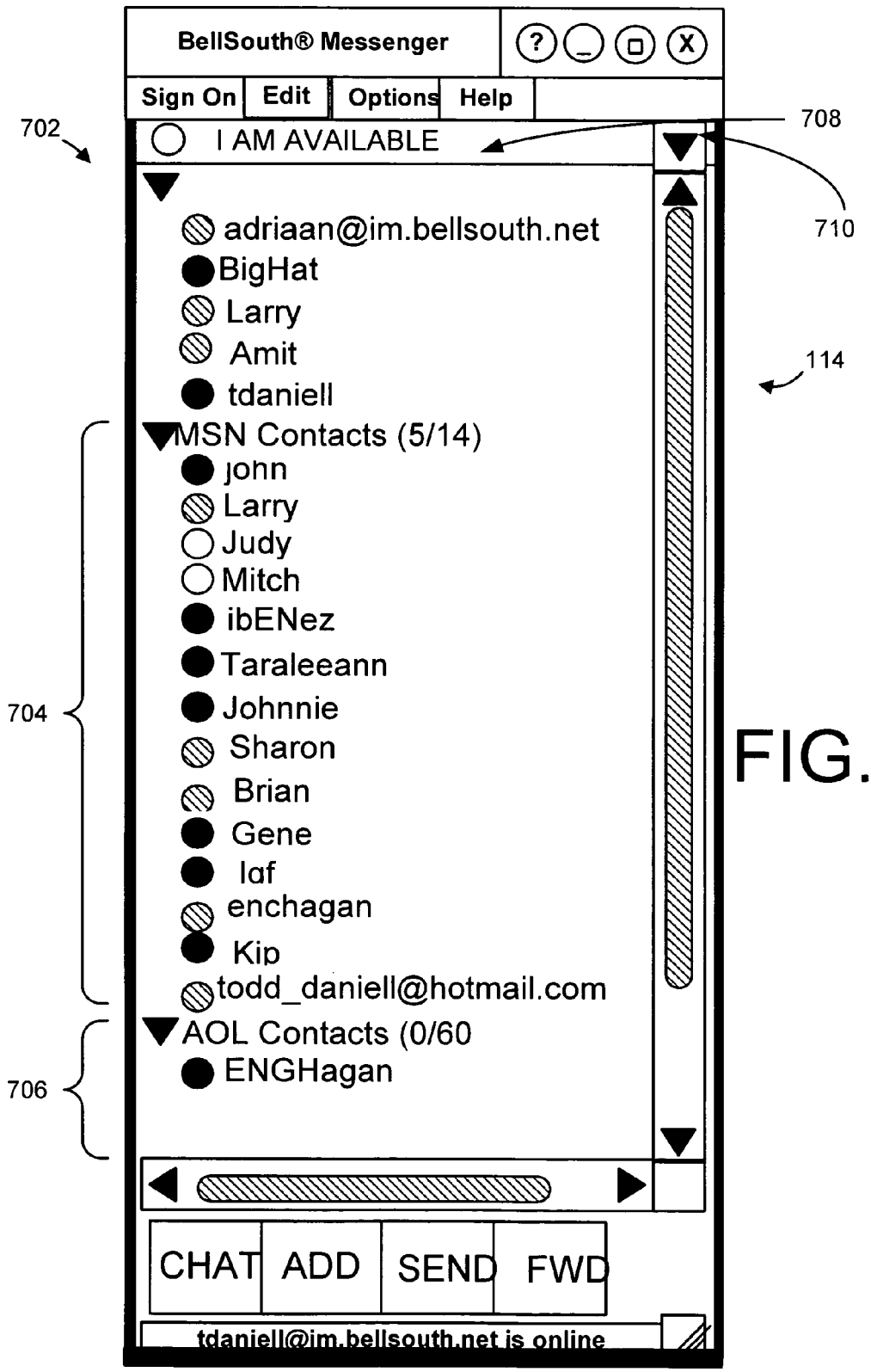
FIG. 7 is a diagram showing one embodiment of the roster window of FIG. 1 in greater detail.

FIG. 7 is a diagram showing one embodiment of the roster window 114 of FIG. 1 in greater detail. As shown in FIG. 7, the roster window 140 comprises a list of contacts 702, which may preferably be sub-divided according to their respective IM accounts. Thus, for example, if the user's contacts have MSN IM accounts and AOL IM accounts, then the contacts having MSN accounts 704 are preferably grouped together while the contacts having AOL accounts 706 are grouped together. The preferred roster window 114 is described in detail in U.S. provisional patent application Ser. Nos. 60/411,336 and 60/419,613, and U.S. patent application Ser. Nos. 10/274,408, 10/274,478, and 10/274,405, which are incorporated by reference herein. It is worthwhile to note that, unlike prior systems, the roster window 114 of FIG. 7 permits a user to initiate an IM session with contacts at various IM addresses without manually logging into multiple IM accounts.

The current status of the user, in this case tdaniel@im.bellsouth.net, is online and available, as indicated by the "I am available" notification 708 in the roster window 114. A selectable button 710 allows the user to select from other options such as an away mode, among others. In some embodiments, other display windows are utilized to provide the user interface for user selectable forwarding options.

Figure 8:
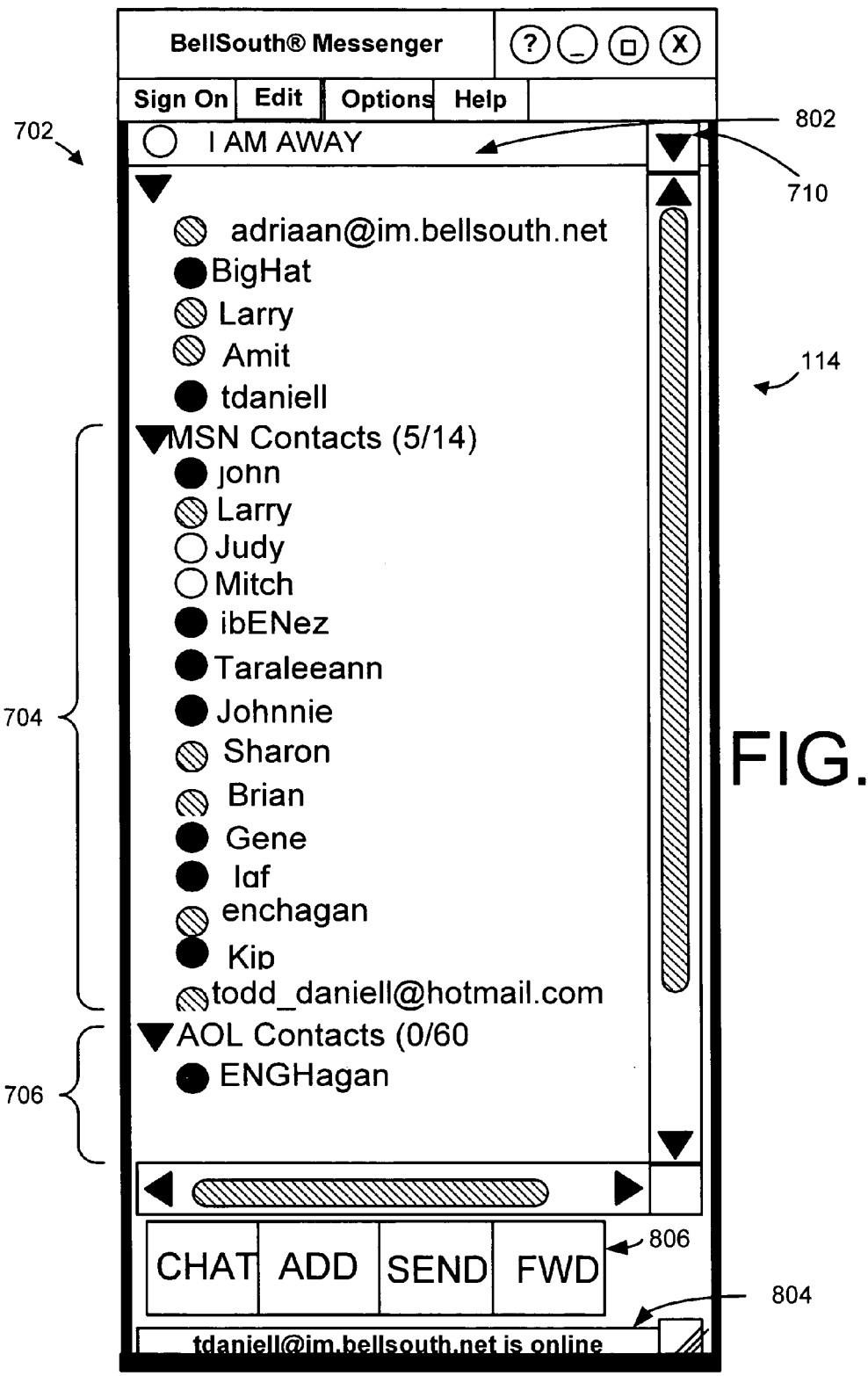
FIG. 8 is a diagram showing another embodiment of the roster window of FIG. 7 where the user is unavailable.

The user has the option to indicate that he or she is unavailable as shown in FIG. 8. FIG. 8 is a diagram showing one embodiment of the roster window 114 where the user is unavailable. The user has selected the "I am away" feature, as indicated by indication 802, that may be user-selectable or a button to indicate that he or she is not currently available at this IM processing device. However, the user is still online as indicated by the notification at 804 that "tdaniel@im.bellsouth.net is online." This state allows the user to select the forward option 806 to forward any incoming IM message to a secondary IM processing device, in accordance with one embodiment of the present invention.

Figure 9:
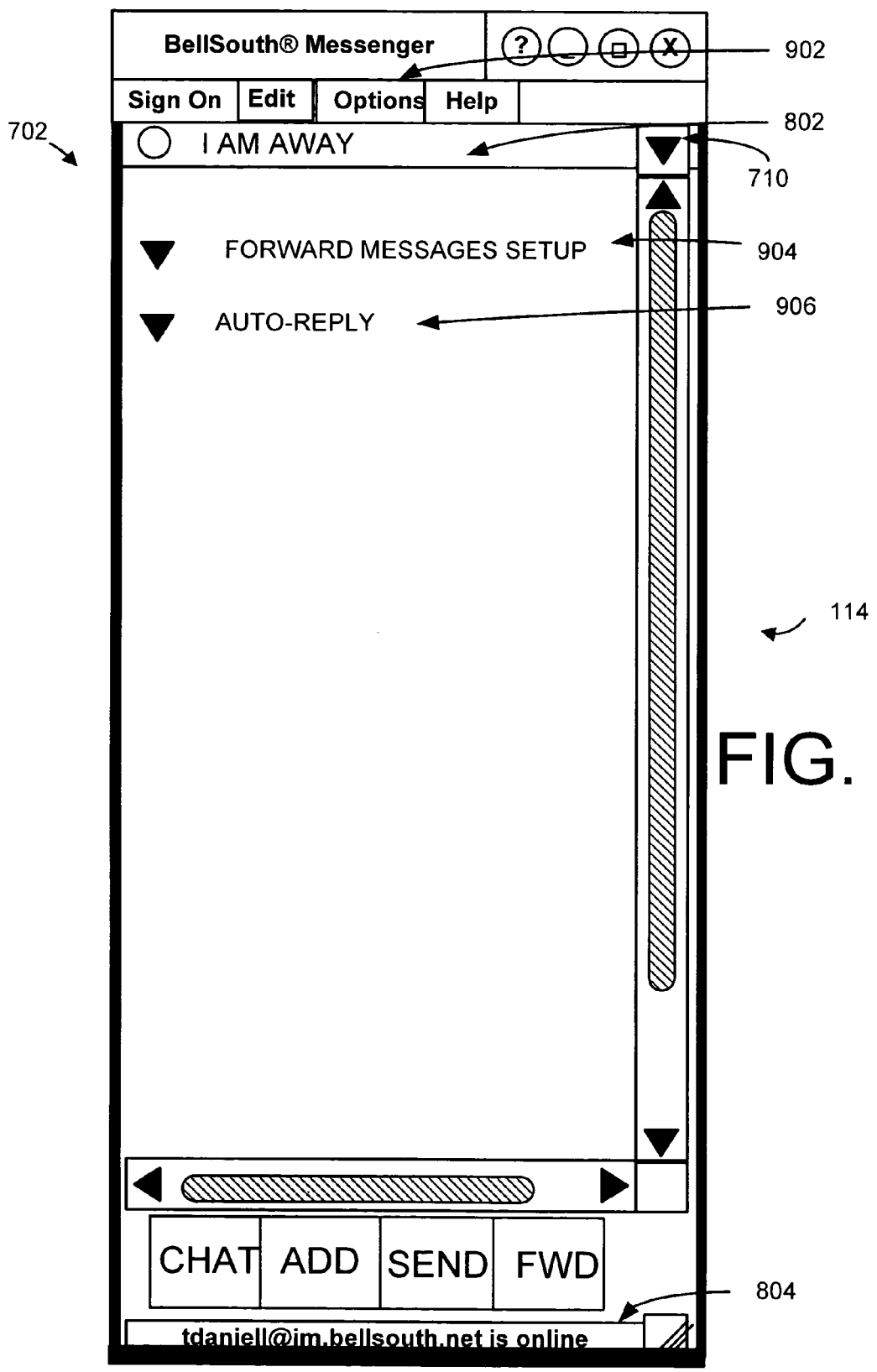
FIG. 9 is a diagram showing one embodiment of the roster window of FIG. 8 for forwarding IM messages when a user is in an away mode.

FIG. 9 is a diagram showing one embodiment of the roster window 1 14 of FIG. 8 for forwarding IM messages when in an away mode in greater detail. The user selects the options button 902 to establish rules for forwarding IM messages received when the user is in the away mode. The user has options to forward messages 904 or auto-reply 906 to the incoming IM messages, among other options. Of course, options, such as forwarding controls, may be provided through other windows instead of, or in addition to, a roster interface in other embodiments.

Figure 10:
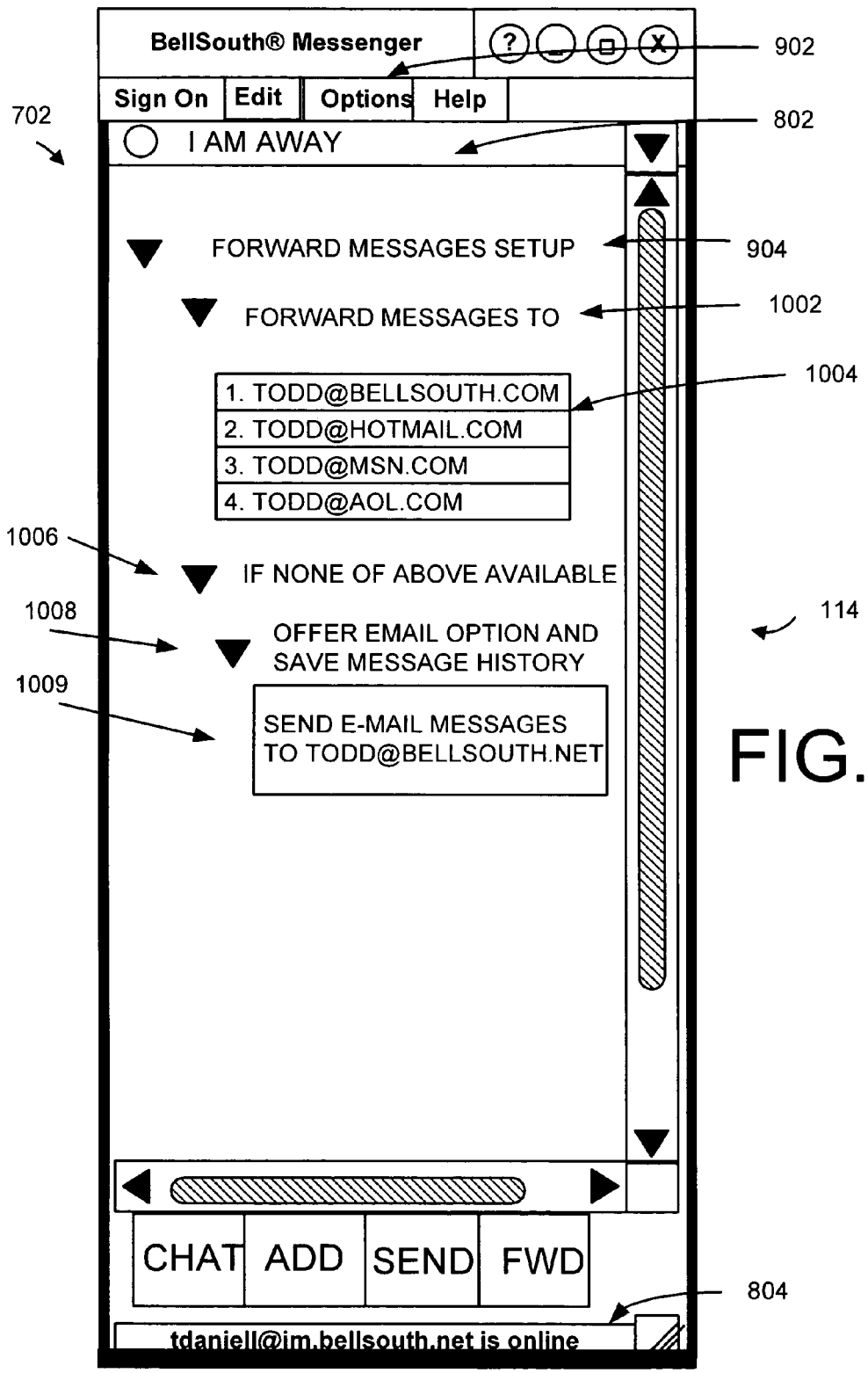
FIG. 10 is a diagram showing one embodiment of the roster window when a user selects the forward option of FIG. 8.

FIG. 10 is a diagram showing one embodiment of the roster window 114 of FIG. 9 when a user selects the forward option 806 of FIG. 8. The user selects the button 1002, which allows the user to specify the address of the IM processing devices to which the incoming IM messages will be forwarded. The incoming IM messages will be forwarded to the addresses in order of priority beginning with the first listed address. For instance, as shown in FIG. 10, a forwarded message will be first sent to Todd@BellSouth.com. If the IM processing device for the user as address Todd@BellSouth.com is unavailable, the system 100 will attempt to forward the message to the second IM processing device at address Todd@hotmail.com. If the IM processing device for the user at address Todd@hotmail is unavailable, the system 100 will attempt to forward the message to the third IM processing device at address Todd@msn.com. If the IM processing device for the user as address Todd@msn.com is unavailable, the system 100 will attempt to forward the message to the fourth IM processing device at address Todd@AOL.com. By forwarding the messages in this manner, the system 100 attempts to forward to all known IM processing devices achieving IM messaging forwarding as contemplated by this invention. A message history including a transcript of the messages is retained by the system 100 as described in FIG. 15.

If none of the IM processing devices are available, the user has the option at 1006 to specify how to handle the incoming IM messages. For example, the user can select the option at 1008, which offers the sender of the IM message the option to send an E-mail message the user. In this case, at 1009, the user specifies which E-mail account to route the message to, which is Todd@BellSouth.net. A transcript of the messages is retained by the client 104.

Figure 11:
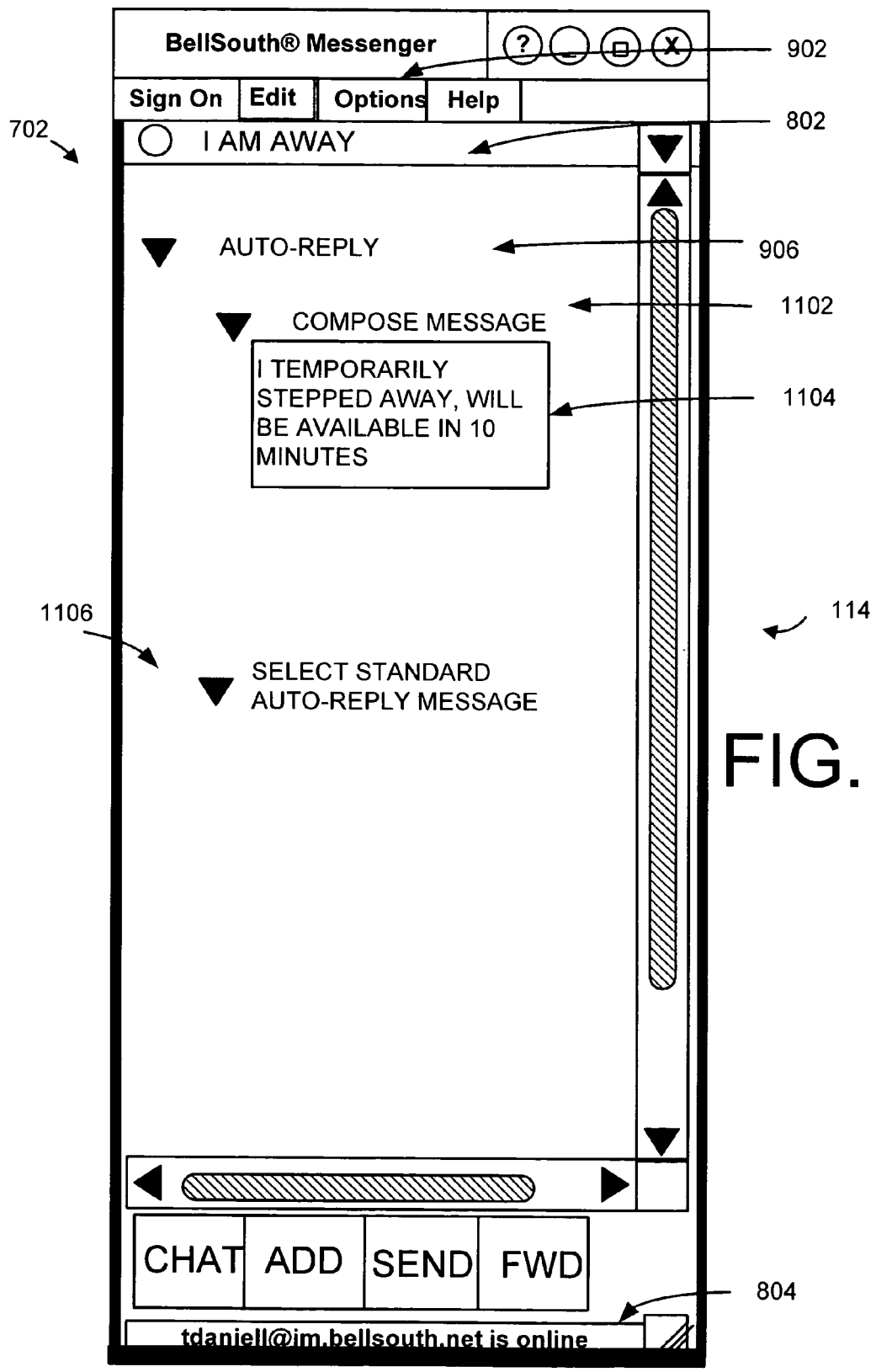
FIG. 11 is a diagram showing one embodiment of the roster window of FIG. 9 when a user selects the auto-reply message option.

FIG. 11 is a diagram showing one embodiment of the roster window 114 of FIG. 9 when a user selects the auto-reply message option 906. At 1102, the user selects the option to compose a message that will be returned to a sender of an incoming IM message. In a preferred embodiment, as is known in the art, the sender will only receive the auto-reply message, either a user composed message or a standard message, the first time the sender sends an IM message to the user in the away mode. In an example, the user composes a message in the text box 1104 that will be forwarded to the sender. In another option, the user can select at 1106 for the sender to receive the standard auto-reply message. In an example, a standard auto-reply message may state that the "User is presently unavailable to respond to IM messages", among other standard messages.

Figure 12:
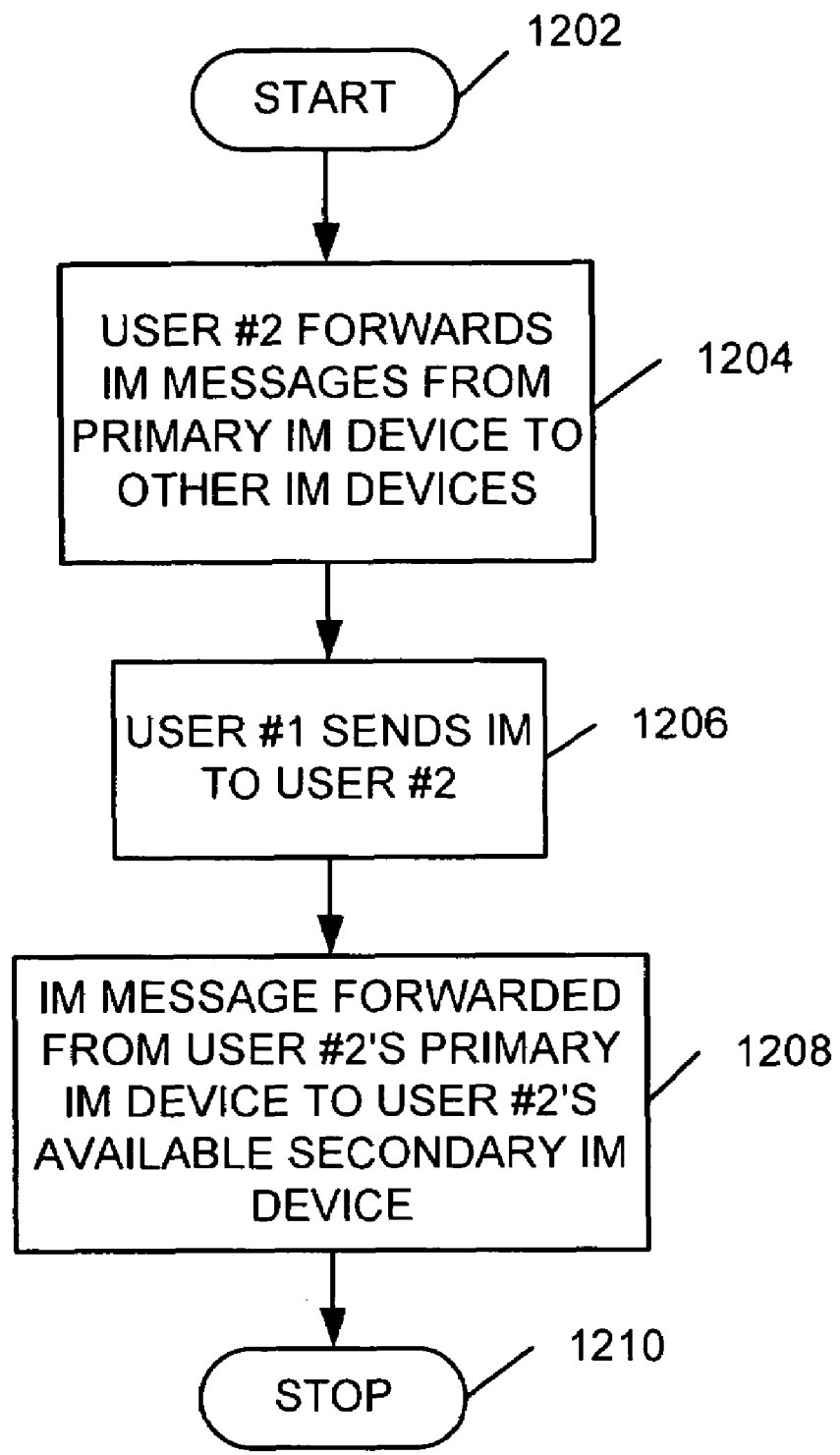
FIG. 12 is a flow chart depicting general functionality of a preferred embodiment for implementing a client proxying system for instant messaging.

FIG. 12 is a flow chart depicting general functionality of a preferred embodiment for implementing a client proxying system for instant messaging. The process begins at 1202. At 1204, a user who previously set up an away mode option at a roster window of an IM processing devices, elects to forward messages from the primary IM processing device to other IM processing devices. In a preferred embodiment, the user's primary IM processing device remains on while the user selects the away mode. At 1206, User# 1 sends an IM message to User#2. In a preferred embodiment, User# 1 is initially, and continues to be, unaware that User#2 is away from their primary IM processing device. In an alternative embodiment, User #1 becomes aware that User#2's primary IM processing device that User#2 is in an away mode. For example, User#1 may receive an E-mail message from User#2 in response to an IM message or User# 1 may receive a chat message from User#2 having a different address than the one User# 1 originally placed on the chat message. At 1208, User#1's IM message is forwarded to User#2's available secondary IM processing device. In a preferred embodiment, User#2 has specified the address and priority of the secondary IM processing devices. An attempt will be made to send the message to User#2's secondary IM processing devices in priority order. If the first listed IM processing device is unavailable, attempts will continue until an available IM processing device is found. In some embodiments, if none of the listed IM processing devices are available, the sender will receive an option to send an E-mail message to the user. The process ends at 1210.

FIG. 13 is a flow chart depicting general functionality of a preferred embodiment for implementing a forwarding setup process. The process begins at 1302. At 1304, a user can enter an away mode through a number of mechanisms. In a preferred embodiment, the user selects the away mode option from a pull down window presented at a roster or other window of a primary IM processing device. In an alternative embodiment, a processing device can enter an away mode automatically when inactivity occurs at the primary IM processing device over a designated period of time. In an example, the away mode is selected as an option at a roster window of an IM processing device. At 1306, the user chooses the forward (e.g., FWD of FIG. 8) selection at the roster window. The user enters addresses of secondary processing devices at 1308. The addresses of the secondary IM processing devices will be utilized to forward incoming IM messages to the user. In a preferred embodiment, the incoming IM messages will be forwarded to the user in the order the addresses are listed.

At 1310, the user determines whether he or she wishes to notify the sender of an IM that none of the listed IM processing devices are available to receive the forwarded incoming IM message. If the user does not wish to notify the sender, at the process ends at 1314. If the user wishes to notify the sender, at 1316, the user selects an option to offer the sender the choice to send an E-mail message to the user. At 1318, the user enters E-mail addresses. In a preferred embodiment, the first E-mail address listed will be selected as the one to receive the E-mail from the sender. The process ends at 1314.

Figure 14A:
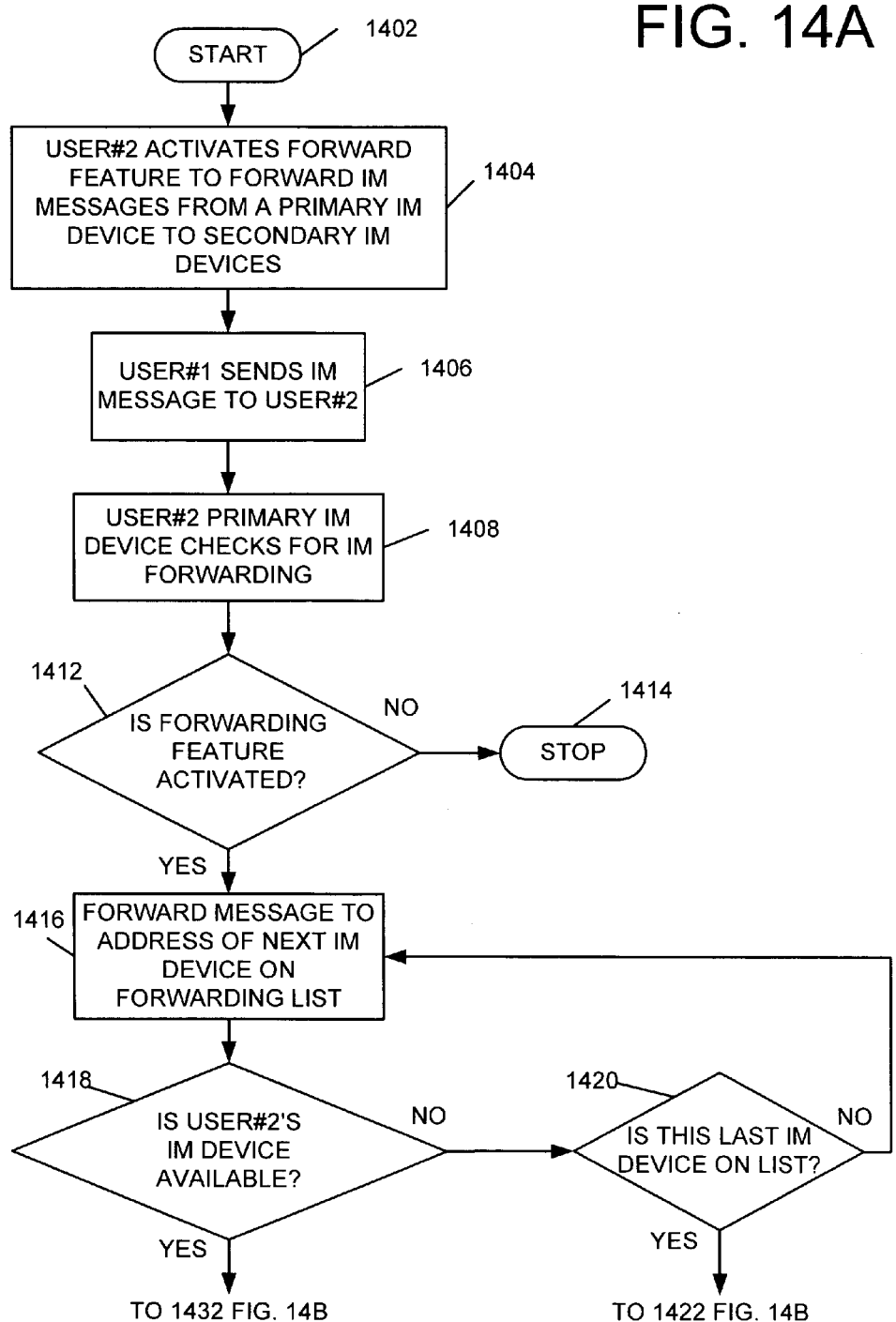

FIGS. 14A and 14B are flow charts depicting more specific functionality of a preferred embodiment for implementing a client proxying system for instant messaging. The process begins at 1402. At 1404, User#2 activates the forward feature to forward incoming IM messages from the user's primary IM processing device to secondary IM processing devices such as selecting option 806 of FIG. 8. In a preferred embodiment, the user utilizes a roster window of the primary IM processing device to activate the forward feature such as selecting option 904 in FIG. 9. At 1406, User#1 sends an IM message to User#2. At 1408, User#2's primary IM processing device checks for IM forwarding. At 1412, a determination is made as to whether the forwarding feature is activated. If the forwarding feature is not activated, the process stops at 1414 and the incoming IM message will not be forwarded. If the forwarding feature is activated, at 1416, the incoming IM message is forwarded to the address of the next IM processing device listed on User#2's forwarding list, in which case it will forward to the first listed address when step 1416 is first performed.

At 1418, a determination is made as to whether the secondary IM processing device is available. If no, at 1420, a determination is made as to whether this IM processing device is the last one on the forwarding list. If no, the process continues at 1416. If yes, the process continues at 1422 on FIG. 14B.

Referring now to FIG. 14B, at 1422, User#1 is queried. In a preferred embodiment, an automatic IM message is sent to User#1, at 1424, prompting User #1 as to whether User #1 wishes to send an E-Mail message to User #2. If User #1 does not wish to send an E-mail message to User #2, the process ends at 1426. In an alternative preferred embodiment, a request to send an E-mail message is sent to User#1, and User#2's primary IM processing device waits for a response from User#1's processing device. If a response is not received within a designated period of time, for instance two minutes, User# 1 will be deemed unavailable and the chat session terminates and the process ends at 1426. If a response is received from User#1's processing device within the designated period of time, the session continues. If User#1 wishes to send an E-mail message to User#2, at 1428, User#1 composes an E-mail message to User#2 using standard processes utilized by User#1's E-mail system. At 1430, User#1 sends an E-mail message to User#2. The process ends at 1426.

If at 1418, User#2's secondary IM processing device is available, at 1432, User#1's IM message is forwarded to User#2's secondary IM processing device and session messages are saved at User#2's primary IM processing device. At 1434, a chat session occurs between User#1's processing device and User#2's secondary IM processing device. At 1436, de-forwarding can occur. De-forwarding can be activated by a user selecting a de-forwarding option such as "I am available option" 708 of FIG. 7 or de-forwarding occurs automatically upon return to the primary IM processing device and user activity is detected such as moving a mouse device or by entering keystrokes which transitions the user to an online state. At 1438, saved messages are retrieved and displayed on the primary IM processing device and forwarding is stopped. In a preferred embodiment, the messages are retrieved from a router of the primary IM processing device and displayed in a chat window. At 1440, a chat session continues between User#1 and User#2, at User#2's primary IM processing device. The process ends at 1426.

FIG. 15 is a data-flow diagram of one embodiment of how forwarded messages are saved before and during forwarding and retrieval after forwarding by primary IM processing device. In an example, a chat session is occurring between two users, User #1 and User #2, at User#2's primary IM processing device 103. At 1502, User #2 sends User #1 a chat message. A record of the chat message is stored on User #2's primary IM processing device in a mail store. At 1504, User #1 replies to User #2's chat message. User #1 receives the message and a record of the response is stored on User #1,'s primary IM processing device in the mail store. At 1506, User #2 goes into away mode and activates IM message forwarding. At 1508, User #1 sends a chat message to User #2. In accordance with this invention, at 1510, the incoming message from User #1 is forwarded to an available secondary IM processing device of User#2 and a record of the message is stored on User #2's primary IM processing device in the mail store. At 1512, User #2 secondary IM processing device sends reply chat message to User #1's IM processing device. A chat session is established between User#2's primary IM processing device and User#2's secondary IM processing device, and another chat session for the same message is established between User#2's primary IM processing device and User#1's IM processing device. At 1514, records of the chat sessions are stored at User#2's primary IM processing device. At 1516, a chat session continues between User #1's processing device and User#2's secondary IM processing device. Effectively a chat session exists between User#2's secondary IM processing device and User#2's primary IM processing device. Records of the chat session are stored at User #2's primary IM processing device at 1518. At 1520, User #2 de-forwards IM messages and enters an available state User#2's primary IM processing device. At 1522, User#2's primary IM processing device retrieves records of the chat messages from the mail store and displays a transcript of the entire chat message history on User #2's primary IM processing device. At 1524, the chat session continues between User#2's primary IM processing device and User# 1's IM processing device. Alternatively, either User#2 or User#1 can terminate the chat session.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The preferred embodiments of the present invention provide systems and methods for forwarding of Instant Messages, including interactive proxying of presence and is transport independent.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A computer-readable storage medium having a computer program for forwarding an E-mail message from a sender to a recipient when attempts to forward an instant message (IM) from the sender are unsuccessful, comprising:
   logic configured to receive an IM from the sender on a primary IM processing device of the recipient;
   logic configured to attempt to forward the IM received on the primary IM processing device from the sender, wherein the IM is attempted to being forwarded from the primary IM processing device to a secondary IM processing device of the recipient;
   logic configured to receive notification at the primary IM processing device that the attempt to forward the IM was unsuccessful;
   logic configured to, in response to the unsuccessful IM attempt to forward the IM to the secondary IM processing device, query the sender of the IM as to whether the sender wishes to send the recipient of the IM an E-mail message including the text of the IM;
   logic configured to include the text of the IM in an E-mail message to be forwarded to the recipient; and
   logic configured to send the E-mail message to the recipient when the sender affirmatively replies to the query.

2. The computer-readable storage medium of claim 1, further comprising logic configured to detect a selection by the sender requesting to send the recipient an E-mail message.

3. The computer-readable storage medium of claim 2, further comprising logic configured to access information on E-mail accounts for the recipient.

4. The computer-readable storage medium of claim 2, further comprising logic configured to receive an event notification at the primary IM processing device from an E-mail server coupled to an E-mail processing device of the sender.

5. The computer-readable storage medium of claim 1, further comprising logic configured to determine that the secondary IM processing device is unavailable when a reply message is not received at the primary IM processing device within a designated time period.

6. The computer-readable storage medium of claim 1, further comprising logic configured to access an address book database to select an address for sending the E-mail message to a processing device of the recipient.

7. The computer-readable storage medium of claim 1, wherein during forwarding of the IM from the primary IM processing device of the recipient to the secondary IM processing device of the recipient, the IM processing device serves as a bridge from one chat session between the sender and the recipient on the IM primary processing device to another chat session between the IM primary processing device and the secondary IM processing device of the recipient.

8. The computer-readable storage medium of claim 7, wherein a user address of the primary IM processing device is replaced by a user address of the secondary IM processing device in an IM message returned to the sender from the primary IM processing device when acting as the bridge.

9. A method for forwarding an E-mail message from a sender to a recipient when attempts to forward an instant message (IM) from the sender are unsuccessful, comprising:
   receiving an IM from the sender on a primary IM processing device of the recipient;
   attempting to forward the IM from the sender, the IM received by the primary IM processing device of the recipient and attempted to being forwarded from the primary IM processing device to the recipient having a secondary IM processing device;
   receiving notification at the primary IM processing device that the attempt to forward the IM was unsuccessful;
   in response to the unsuccessful IM attempt to forward the IM, querying the sender of the IM as to whether the sender wishes to send the recipient of the IM an E-mail message including the text of the IM;
   including the text of the IM in an E-mail message to be forwarded to the recipient; and
   sending the E-mail message to the recipient when the sender affirmatively replies to the query.

10. The method of claim 9, further comprising detecting a selection by the sender requesting to send the recipient an E-mail message.

11. The method of claim 10, further comprising accessing information on E-mail accounts for the recipient.

12. The method of claim 10, further comprising receiving an event notification at the primary IM processing device from an E-mail server coupled to an E-mail processing device of the sender.

13. The method of claim 9, further comprising determining that the secondary IM processing device is unavailable when a reply message is not received at the primary IM processing device within a designated time period.

14. The method of claim 9, further comprising accessing an address book database to select an address for sending the E-mail message to a processing device of the recipient.

15. The method of claim 9, wherein during forwarding of the IM from the primary IM processing device of the recipient to the secondary IM processing device of the recipient, the IM processing device serves as a bridge from one chat session between the sender and the recipient on the IM primary processing device to another chat session between the IM primary processing device and the secondary IM processing device of the recipient.

16. The method of claim 15, wherein a user address of the primary IM processing device is replaced by a user address of the secondary IM processing device in an IM message returned to the sender from the primary IM processing device when acting as the bridge.

* * * * *